(12) United States Patent
Yeh

(10) Patent No.: US 9,086,954 B2
(45) Date of Patent: Jul. 21, 2015

(54) DATA STORING METHOD, MEMORY CONTROLLER AND MEMORY STORAGE APPARATUS

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 331 days.

(21) Appl. No.: 13/717,723

(22) Filed: Dec. 18, 2012

(65) Prior Publication Data

US 2014/0082259 A1    Mar. 20, 2014

(30) Foreign Application Priority Data

Sep. 20, 2012  (TW) .............................. 101134523 A

(51) Int. Cl.
*G06F 12/02* (2006.01)
*G06F 11/10* (2006.01)

(52) U.S. Cl.
CPC ........ *G06F 12/0246* (2013.01); *G06F 11/1048* (2013.01); *G06F 2212/1032* (2013.01); *G06F 2212/7201* (2013.01); *G06F 2212/7202* (2013.01); *G06F 2212/7211* (2013.01)

(58) Field of Classification Search
CPC ..................... G06F 12/0246; G06F 2212/7201; G06F 2212/7202; G06F 2212/7211
USPC ......................................................... 711/103
See application file for complete search history.

(56) References Cited

U.S. PATENT DOCUMENTS

2007/0140030 A1    6/2007  Wyatt
2007/0168625 A1*   7/2007  Cornwell et al. ............. 711/157

OTHER PUBLICATIONS

Office Action of Taiwan Counterpart Application, issued on Sep. 26, 2014, p. 1-p. 3, in which the listed reference was cited.

* cited by examiner

*Primary Examiner* — Kalpit Parikh
(74) *Attorney, Agent, or Firm* — Jianq Chyun IP Office

(57) ABSTRACT

A data storing method for a memory storage apparatus having a flash memory module is provided. The method includes detecting the operating temperature of the memory storage device through a thermal sensor and determining whether the operating temperature of the memory storage device is larger than a predetermined temperature. The methods further includes using a first data storing mode to access the flash memory module if the operating temperature of the memory storage device is not larger than the predetermined temperature; and using a second data storing mode to access the flash memory module if the operating temperature of the memory storage apparatus is larger than the predetermined temperature, wherein the first data storing mode is different from the second data storing mode. Accordingly, the method can effectively ensure the accuracy of the data stored into the flash memory module.

18 Claims, 13 Drawing Sheets

US 9,086,954 B2

DATA STORING METHOD, MEMORY CONTROLLER AND MEMORY STORAGE APPARATUS

CROSS-REFERENCE TO RELATED APPLICATION

This application claims the priority benefit of Taiwan application serial no. 101134523, filed on Sep. 20, 2012. The entirety of the above-mentioned patent application is hereby incorporated by reference herein and made a part of this specification.

BACKGROUND

1. Technology Field

The present invention relates to a data storing method for a flash memory module, a memory controller using the method, and a memory storage apparatus using the method.

2. Description of Related Art

Along with the widespread of digital cameras, cell phones, and MP3 in recently years, the consumers' demand for storage media has increased drastically. Since a rewritable non-volatile memory has the characteristics of non-volatility of data, low power consumption, small volume, non-mechanical structure, and fast reading and writing speed, the rewritable non-volatile memory is the most adaptable memory to be applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

An NAND flash memory may be classified into a Single Level Cell (SLC) NAND flash memory, a Multi Level Cell (MLC) NAND flash memory, or a Trinary Level Cell (TLC) NAND flash memory according to the number of bits which each memory cell thereof is capable of storing. Specifically, each memory cell in the SLC NAND flash memory can store one bit of data (i.e., "1" or "0"), each memory cell in the MLC NAND flash memory can store two bits of data, and each memory cell in the TLC NAND flash memory can store three bits of data.

In the NAND flash memory, a physical page is composed of several memory cells arranged on the same word line. Since each memory cell in the SLC NAND flash memory can store one bit of data, several memory cells arranged on the same word line in the SLC NAND flash memory correspond to one physical page.

By contrast, a floating gate storage layer in each memory cell of the MLC NAND flash memory can store two bits of data, and each storage state (i.e., "11," "10," "01," or "00") includes the least significant bit (LSB) and the most significant bit (MSB). For instance, the first bit from the left of the storage states is the LSB, and the second bit from the left of the storage states is the MSB. Accordingly, several memory cells arranged on the same word line may constitute two physical pages, wherein the physical pages constituted by the LSB of the memory cells are referred to as lower physical pages and the physical pages constituted by the MSB of the memory cells are referred to as upper physical pages. The speed of writing data into the lower physical page is faster than writing data into the upper physical page, and when a program failure occurs in the process of programming the upper physical page, the data stored in the lower physical page corresponding to the programmed upper physical page may be lost.

Similarly, each memory cell in the TLC NAND flash memory can store three bits of data, and each storage state (i.e., "111," "110," "101," "100," "011," "010," "001," or "000") includes the first bit (i.e., the LSB), the second bit (i.e., the center significant bit, CSB), and the third bit (i.e., the MSB) from the left of the storage states. Accordingly, several memory cells arranged on the same word line may constitute three physical pages, wherein the physical pages constituted by the LSB of the memory cells are referred to as lower physical pages, the physical pages constituted by the CSB of the memory cells are referred to as center physical pages, and the physical pages constituted by the MSB of the memory cells are referred to as upper physical pages. In particular, while several memory cells on the same word lines are programmed, only the lower physical page can be programmed, or all of the lower, the center, and the upper physical pages need be simultaneously programmed; otherwise, the stored data may be lost.

However, regardless of SLC flash memory, MLC flash memory or TLC flash memory, when data stored in the same block is read repeatedly (for example, between 100000 times and 1000000 times), the data read may be incorrect or data stored in this block may even be lost. Such a situation is usually referred as "read disturb" by people skilled in the art. In particular, the system data (for example, a firmware code and a file allocation table (FAT)) of a flash memory storage system is stored in a flash memory, and the system data is frequently read during the operation of the flash memory storage system. Accordingly, a technique for resolving the problem of read disturb has to be provided for effectively preventing data loss caused by read disturb.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data storing method, a memory controller, and a memory storage apparatus capable of reliably storing data and preventing data loss.

According to an exemplary embodiment of the present invention, a data storing method for a memory storage apparatus having a flash memory module is provided. The flash memory module has a plurality of physical erase unit and each of the physical erase unit has a plurality of physical program unit. The data storing method includes detecting an operating temperature of the memory storage apparatus and determining whether the operating temperature of the memory storage apparatus is larger than a predetermined temperature. The data storing method further includes programming the flash memory module by using a first data storing mode if operating temperature of the memory storage apparatus is not larger than the predetermined temperature, and programming the flash memory module by using a second data storing mode if operating temperature of the memory storage apparatus is larger than the predetermined temperature, wherein the first data storing mode is different from the second data storing mode.

According to an exemplary embodiment of the present invention, a memory controller for controlling a memory storage apparatus having a flash memory module is provided, wherein the flash memory module has a plurality of physical erase unit and each of the physical erase unit has a plurality of physical program unit. The memory controller includes a host interface, a memory interface, an error checking and correcting (ECC) circuit and a memory management circuit. The host interface is configured to couple to the host system. The memory interface is configured to couple to the flash memory module. The memory management circuit is coupled to the host interface, the memory interface, and the error checking and correcting (ECC) circuit. The memory management circuit is configured to detect an operating temperature of the memory storage apparatus and determine whether the operating temperature of the memory storage apparatus is larger than a predetermined temperature. The memory management circuit is configured to program the flash memory module by using a first data storing mode if the operating temperature of the memory storage apparatus is not larger than the predetermined temperature, and the memory management circuit is configured to program the flash memory module by using a second data storing mode if the operating temperature of the memory storage apparatus is larger than the predetermined temperature, wherein the first data storing mode is different from the second data storing mode.

According to an exemplary embodiment of the present invention, a memory storage apparatus including a connector, a flash memory module, a thermal sensor and a memory controller is provided. The connector is configured to couple to the host system. The flash memory module has a plurality of physical erase unit and each of the physical erase unit has a plurality of physical program unit. The memory controller is coupled to the connector and the flash memory module. The thermal sensor is coupled to the memory controller and configured to detect an operating temperature. Herein, the memory controller is further configured to determine whether the operating temperature is larger than a predetermined temperature. The memory controller is configured to program the flash memory module by using a first data storing mode if the operating temperature is not larger than the predetermined temperature, and the memory controller is configured to program the flash memory module by using a second data storing mode if the operating temperature is larger than the predetermined temperature, wherein the first data storing mode is different from the second data storing mode.

Based on the above, the data storing method, the memory controller, and the memory storage apparatus are capable of storing data with a suitable mode according to the temperature of the memory storage apparatus, thereby preventing data loss.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned features and advantages of the present invention more comprehensible, embodiments accompanying figures are described in detail below.

DESCRIPTION OF EMBODIMENTS

Figure 1A:
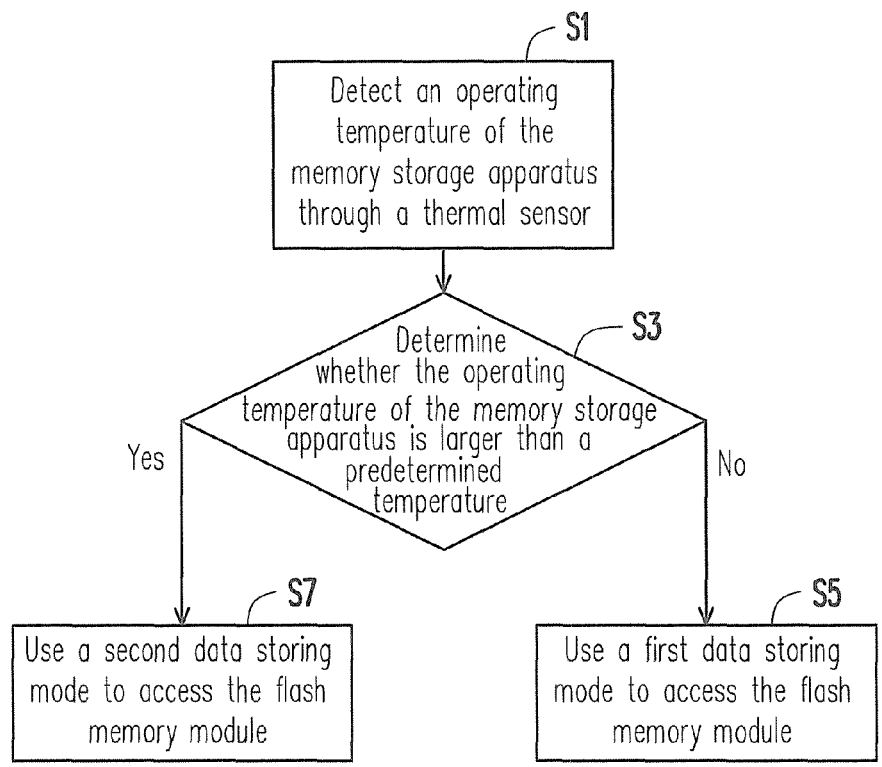
FIG. 1A is a flowchart illustrating the steps of the data storing method according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In order to ensure that data is correctly stored into a memory storage apparatus, a data storing method provided by an exemplary embodiment of the present invention detects an operating temperature of the memory storage apparatus through a thermal sensor (S1) and determines whether the operating temperature of the memory storage apparatus is larger than a predetermined temperature (S3). A first data storing mode is used to access the flash memory module if the operating temperature of the memory storage apparatus is not larger than the predetermined temperature (S5), and a second data storing mode is used to access the flash memory module if the operating temperature of the memory storage apparatus is larger than the predetermined temperature (S7), wherein the first data storing mode is different from the second data storing mode and the clock rate of a controller of the memory apparatus operated in the first data storing mode is the same that in the second data storing mode. Several exemplary embodiments are described below to illustrate the present invention in detail.

First Exemplary Embodiment

A memory storage apparatus (i.e., a memory storage system) typically includes a flash memory module and a controller (i.e., a control circuit). The memory storage apparatus is usually used together with a host system, such that the host system can write data into or read data from the memory storage apparatus.

Figure 1B:
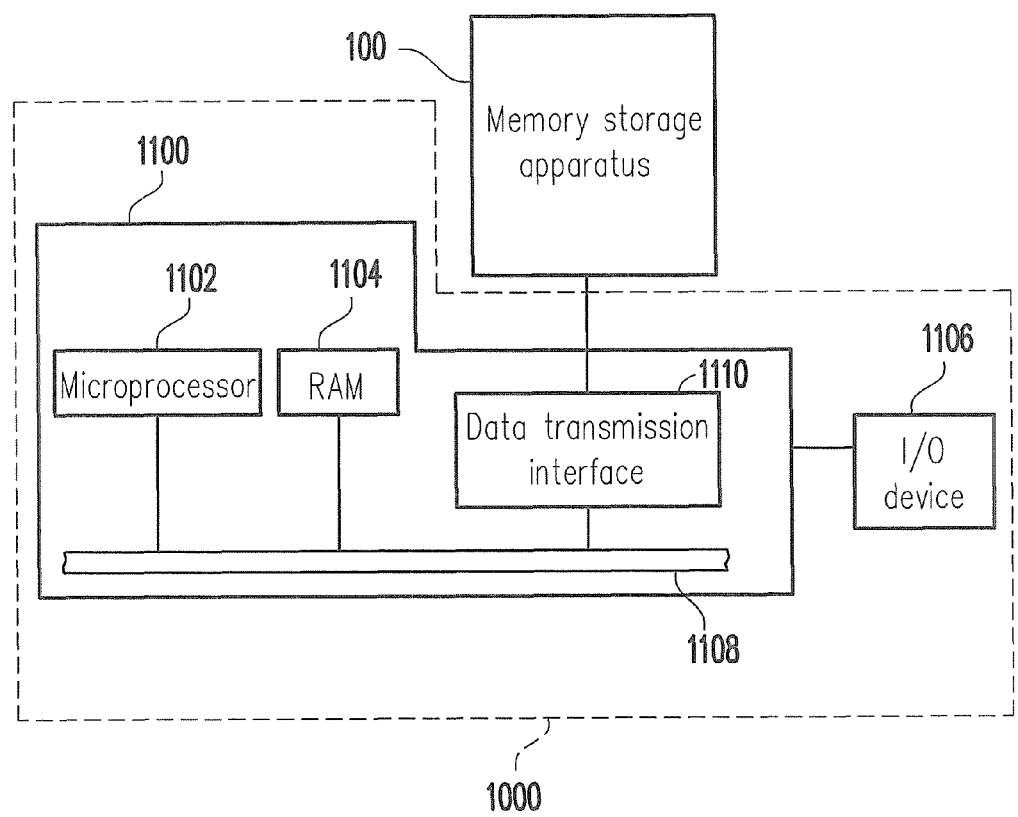
FIG. 1B illustrates a host system and a memory storage apparatus according to an exemplary embodiment.

FIG. 1B illustrates a host system and a memory storage apparatus according to a first exemplary embodiment.

Figure 2:
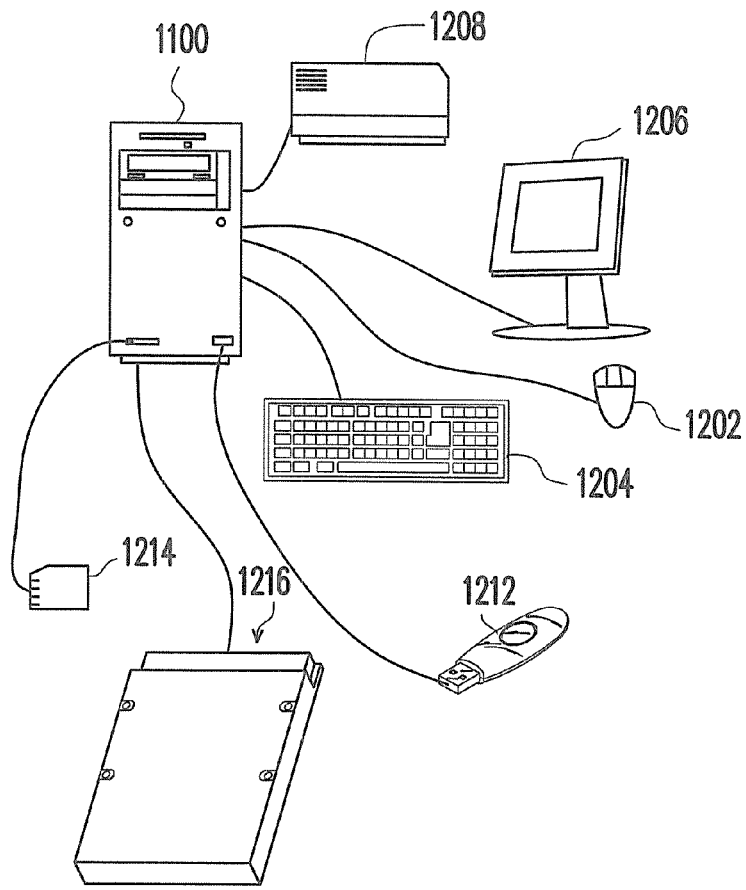
FIG. 2 schematically illustrates a computer, an input/output (I/O) device, and a memory storage apparatus according to an exemplary embodiment.

With reference to FIG. 1B, a host system 1000 usually includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2. It should be understood that, the devices depicted in FIG. 2 should not be construed as limitations to the present disclosure, and the I/O device 1106 may include other devices as well.

In the exemplary embodiment of the present invention, the memory storage apparatus 100 is coupled to other devices of the host system 1000 through the data transmission interface 1110. By using the microprocessor 1102, the RAM 1104, and the I/O device 1106, the data can be written into or read from the memory storage apparatus 100. For example, the memory storage apparatus 100 may be a non-volatile memory storage apparatus, such as a flash drive 1212, a memory card 1214, or a solid state drive (SSD) 1216 shown in FIG. 2.

Figure 3:
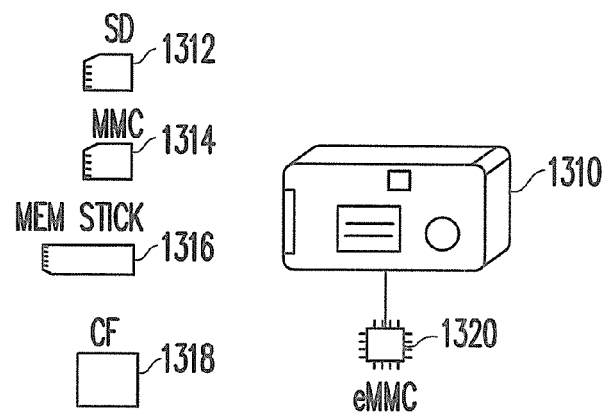
FIG. 3 illustrates a host system and a memory storage apparatus according to an exemplary embodiment.

Generally, the host system 1000 can substantially be any system used together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so on. For example, if the host system is a digital camera (video camera) 1310, the memory storage apparatus is then a SD card 1312, a MMC card 1314, a memory stick 1316, a CF card 1318 or an embedded storage device 1320 (as shown in FIG. 3). The embedded storage device 1320 includes an embedded MMC (eMMC). It should be noted that the eMMC is directly coupled to a substrate of the host system.

Figure 4:
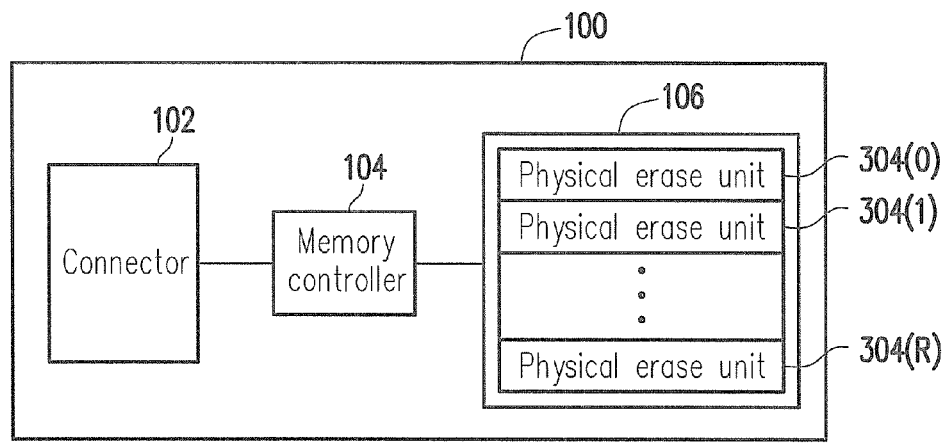
FIG. 4 is a schematic block diagram illustrating the memory storage apparatus depicted in FIG. 1B.

FIG. 4 is a schematic block diagram illustrating a memory controller according to the first exemplary embodiment.

With reference to FIG. 4, the memory storage apparatus 100 includes a connector 102, a memory controller 104, a flash memory module 106 and a thermal sensor 108.

In the present exemplary embodiment, the connector 102 complies with the serial advanced technology attachment (SATA) interface standard. However, the present invention is not limited thereto, and the connector 102 may comply with the parallel advanced technology attachment (PATA) interface standard, the Institute of Electrical and Electronic Engineers (IEEE) 1394 interface standard, the peripheral component interconnect (PCI) express interface standard, the universal serial bus (USB) standard, the secure digital (SD) interface standard, the Ultra High Speed-I (UHS-I) interface standard, the Ultra High Speed-II (UHS-II) interface standard, the memory sick (MS) interface standard, the multi media card (MMC) interface standard, the Embedded Multimedia Card (eMMC), the Universal Flash Storage (UFS) interface standard, the compact flash (CF) interface standard, the integrated device electronics (IDE) interface standard, or other suitable interface standards.

The memory controller 104 executes a plurality of logic gates or control instructions implemented in a hardware form or a firmware form and performs various data operations in the memory module 106 according to commands of the host system 1000, such as data writing, reading, and erasing.

The flash memory module 106 is coupled to the memory controller 104 and configured to store data written by the host system 1000. The flash memory module 106 includes physical erase units 304(0)~304(R). For instance, the physical erase units 304(0)-304(R) can belong to the same memory die or different memory dies. Each of the physical erase units includes a plurality of physical program units and the physical program units which belong to the same physical erase unit can be written separately but erased together. For example, each physical erase unit is composed of 128 physical program units. However, the present invention is not limited thereto, and each of the physical erase units may also be comprised of 64, 256, or any other number of physical program units.

To be more specific, the physical erase unit is the smallest erasing unit. That is to say, each of the physical erase units contains the least number of memory cells that are erased together. And, one physical program unit is the smallest programming unit. In other words, each physical program unit is the smallest unit for writing the data. Each physical program unit usually includes a data bit area and a redundant bit area. The data bit area includes a plurality of physical access address for storing user data, and the redundant bit area is used for storing system data (e.g., error checking and correcting (ECC) codes). In the present exemplary embodiment, the data bit area of each physical program unit includes 4 physical access addresses and the size of one physical access address is 512 bytes. However, in another exemplary embodiment, the data bit area may include more or less physical access addresses and the present is not limited that the size and the number of the physical access addresses. For example, in an exemplary embodiment, each physical erase unit is a physical block and each physical program unit is a physical page or a physical sector. However, it should be noted that the present invention is not limited thereto.

In the present exemplary embodiment, the flash memory module 106 is a multi-level cell (MLC) NAND flash memory module, i.e., one memory cell is capable of storing at least 2 bits of data. However, the present invention is not limited thereto, and the memory module 106 may also be a single level cell (SLC) NAND flash memory module, a trinary level cell (TLC) NAND flash memory module, other flash memory module or other memory module having the same characteristic.

The thermal sensor 108 is coupled to the memory controller 104 and configured to detect the operating temperature of the memory storage apparatus 100. To be specific, during the operation of the memory storage apparatus 100, electronic elements disposed in the memory storage apparatus 100 generates thermal energy and therefore the operating temperature of the memory storage apparatus 100 rises. In the present exemplary embodiment, the thermal sensor 108 transmits information about current operating temperature of the memory storage apparatus 100 to the memory controller 104. For example, the thermal sensor 108 may periodically transmit information about current operating temperature of the memory storage apparatus 100 to the memory controller 104, or transmit information about current operating temperature of the memory storage apparatus 100 to the memory controller 104 in response to a query from the memory controller 104.

Figure 5:
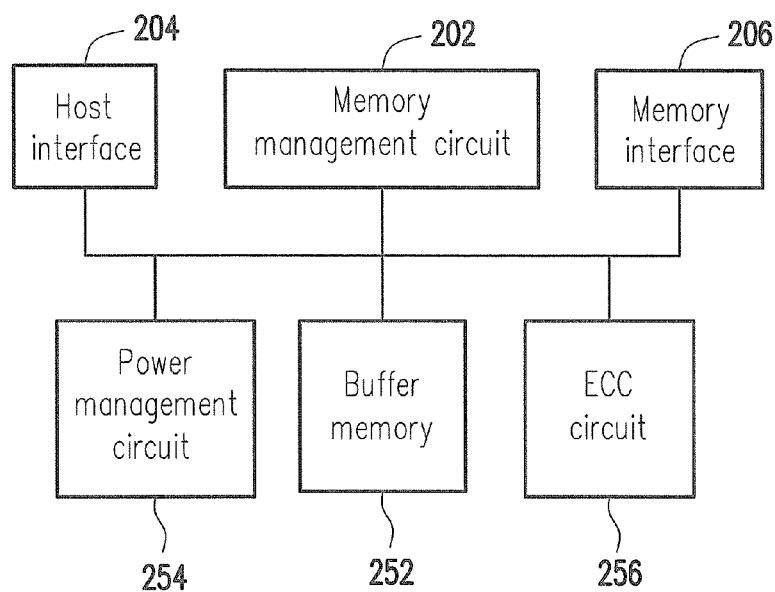
FIG. 5 is a schematic block diagram illustrating a memory controller according to an exemplary embodiment.

FIG. 5 is a schematic block diagram illustrating a memory controller according to an exemplary embodiment. It should be understood that the memory controller depicted in FIG. 5 is merely exemplary and should not be construed as a limitation to the present invention.

Referring to FIG. 5, the memory controller 104 includes a memory management circuit 202, a host interface 204 and a memory interface 206.

The memory management circuit 202 is configured to control the whole operation of the memory controller 104. Particularly, the memory management circuit 202 has a plurality of control instructions; when the memory storage apparatus 100 is operated, the control instructions are executed to perform a data writing operation, a data reading operation, a data erasing operation, and so on.

In the present exemplary embodiment, the control instructions of the memory management circuit 202 are implemented in a firmware form. For example, the memory management circuit 202 includes a microprocessor unit (not shown) and a read-only memory (ROM, not shown), where the control instructions are burnt in the read-only memory. When the memory storage apparatus 100 is operated, the control instructions are executed by a microprocessor unit to write, read, and erase data.

In another exemplary embodiment of the present invention, the control instructions of the memory management circuit 202 are stored in a form of program codes in a specific area (e.g., the system area of the flash memory module exclusively used for storing system data) of the flash memory module 106. Moreover, the memory management circuit 202 includes a microprocessor unit (not shown), a read-only memory (ROM, not shown) and a random access memory (not shown). Particularly, the read-only memory has a boot code, and when the memory controller 104 is enabled, the microprocessor unit executes the boot code to load the control instructions stored in the flash memory module 106 into the RAM of the memory management circuit 202. The microprocessor unit then executes the control instructions to write, read, and erase data.

Furthermore, as in another exemplary embodiment, the control instructions in the memory management circuit 202 are implemented in a hardware form. For example, the memory management circuit 202 includes a micro controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro controller. The memory cell circuit is configured to manage the physical erase units of the flash memory module 106; the memory writing circuit is configured to give a write command to write data into the flash memory module 106; the memory reading circuit is configured to give a read command to read data from the flash memory module 106; the memory erasing circuit is configured to give an erase command to erase data from the flash memory module 106 and the data processing circuit is configured to process data to be written into the flash memory module 106 or data read from the flash memory module 106.

The host interface 204 is coupled to the memory management circuit 202 and configured to receive and identify the commands and the data transmitted by the host system 1000. Namely, the commands and data transmitted by the host system 1000 are passed to the memory management circuit 202 through the host interface 204. In the present exemplary embodiment, the host interface 204 complies with the SATA interface standard. However, the present invention is not limited thereto, and the host interface 204 may also comply with the PATA interface standard, the IEEE 1394 interface standard, the PCI Express interface standard, the USB standard, the SD interface standard, the USH-I interface standard, the USH-II interface standard, the MS interface standard, the MMC interface standard, the eMMC interface standard, the UFS interface standard, the CF interface standard, the IDE interface standard, or any other appropriate data transmission interface standard.

The memory interface 206 is coupled to the memory management circuit 202 and configured for accessing the flash memory module 106. Namely, the data to be written into the flash memory module 106 is converted by the memory interface 206 into a format acceptable to the flash memory module 106.

In an exemplary embodiment of the present invention, the memory controller 104 further includes a buffer memory 252, a power management circuit 254 and an error checking and correcting circuit 256.

The buffer memory 252 is coupled to the memory management circuit 202 and configured to temporarily store data and commands from the host system 1000 or data from the flash memory module 106.

The power managing circuit 254 is coupled to the memory management circuit 202 and configured to control the power of the memory storage apparatus 100.

The error checking and correcting circuit 256 is coupled to the memory management circuit 202 and configured to perform an error checking and correcting procedure to assure the accuracy of data. In the present exemplary embodiment, when the memory management circuit 202 receives a write command from the host system 1000, the error checking and correcting circuit 256 generates an error checking and correcting (ECC) code for data corresponding to the write command, and the memory management circuit 202 writes the data and the corresponding ECC code into the flash memory module 106. Subsequently, when the memory management circuit 202 reads the data from the flash memory module 106, the memory management circuit 202 simultaneously reads the ECC code corresponding to the read data, and the error checking and correcting circuit 256 executes the ECC procedure for the read data based on the corresponding ECC code. To be specific, the error checking and correcting circuit 256 is designed to be capable of correcting error bits occurring in the read data if the number of the error bits is smaller than or equal to the maximum correctable error bit number. For example, the maximum correctable error bit number is 48. If the number of the error bits occurring in the read data is not larger than the maximum correctable error bit number, the error checking and correcting circuit 256 can correct the error bits based on the corresponding ECC code. If the number of the error bits occurring in the read data is larger than the maximum correctable error bit number, the error checking and correcting circuit 256 informs a failure in the correction of error bits and the memory management circuit 202 transmits a message, which indicates that data is lost, to the host system 1000.

Figure 6:
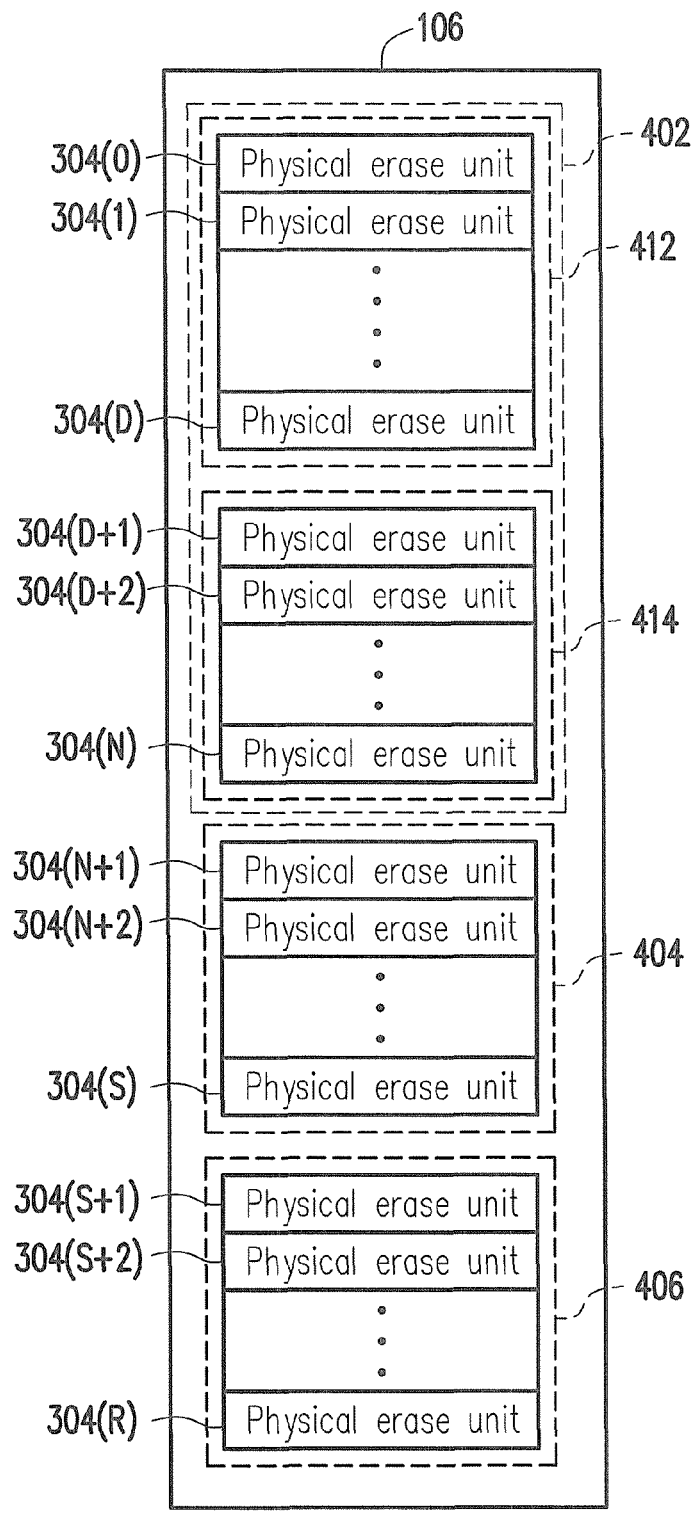
FIG. 6 and FIG. 7 are diagrams of managing the memory module according to an exemplary embodiment.
Figure 7:
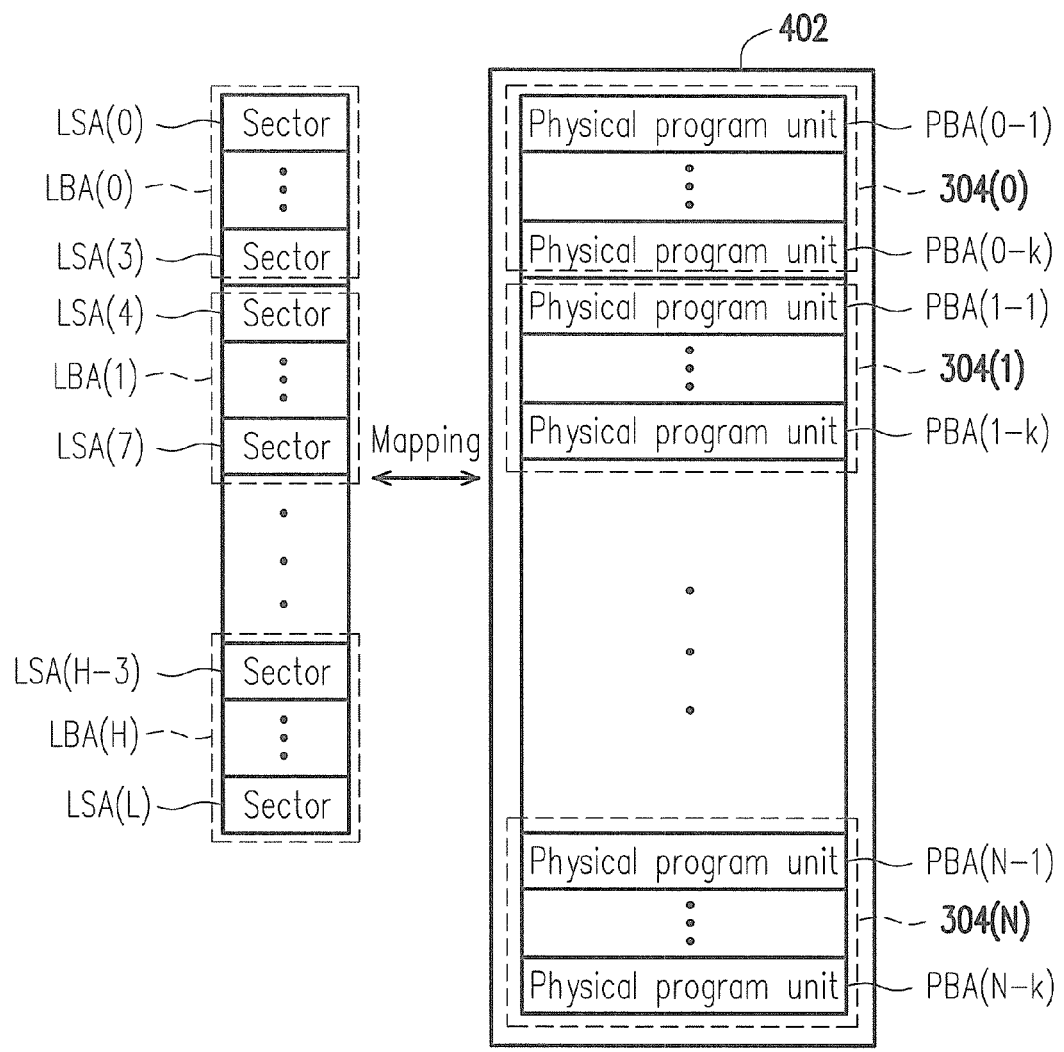

FIG. 6 and FIG. 7 are diagrams of managing the flash memory module according to an exemplary embodiment.

It should be understood that the terms used herein for describing the operations (for example, "get", "select", "replace", "group", and "alternate", etc) performed on the physical erase units of a flash memory module 106 refer to logical operations performed on these physical erase units. Namely, the physical erase units in the flash memory module are only logically operated and the actual positions thereof are not changed.

Referring to FIG. 6, the memory controller 104 (or memory management circuit 202) logically groups the physical erase units 304(0)~304(R) of the flash memory module 106 into a storage area 402, a system area 404 and a replacement area 406.

The physical erase units logically belonging to the storage area 402 are used for storing data written by the host system 1000. Namely, the memory storage apparatus 100 uses the physical erase units in the storage area 402 for actually storing data written by the host system 1000. To be specific, the memory controller 104 (or memory management circuit 202) groups the physical erase units the storage area 402 into a data area 412 and a spare area 414, the physical erase units of the data area 412 (also referred to as data physical erase units) have stored data and the physical erase units of the spare area 414 (also referred to as spare physical erase units) is used for alternating the physical erase units of the data area 412. Hence, the physical erase units of the spare area 414 are either blank or available physical erase units (i.e., no data is recorded in these physical erase units or data recorded in these physical erase units is marked as invalid data). That is, the physical erase units of the spare area 414 have been operated by an erasing operation, or when a physical erase unit of the spare area 414 is gotten for storing data, the gotten physical erase unit needs to be operated by the erasing operation first. Hence, the physical erase units of the spare area 414 are available physical erase units. Specifically, when a physical erase unit is selected for storing valid data, this physical erase unit is associated with the data area 412. And, the memory controller 104 (or memory management circuit 202) performs the erasing operation on physical erase units, all data stored into which is invalid, in the data area 412 and associates the erased physical erase units with the spare area 414, thereby the physical erase units can alternatively store data written by the host system 1000.

The physical erase units logically belonging to the system area 404 are used for recording system data, which includes information related to the manufacturer and a model of the flash memory module, the number of the zones in each flash memory module, the number of the physical erase units in each zone, the number of the physical program units in each physical erase unit, and so forth.

The physical erase units logically belonging to the replacement area 406 are replacement physical erase units. For example, when the flash memory module 106 is manufactured in the factory, 4% of the physical erase units thereof are reserved for replacement. Namely, when any physical erase unit in the data area 412, the spare area 414, and the system area 404 is damaged, a physical erase unit in the replacement area 406 is used for replacing the damaged physical erase unit (i.e., the bad physical erase unit). Thus, if there are still normal physical erase units in the replacement area 406 and a physical erase unit is damaged, the memory controller 104 gets a normal physical erase unit from the replacement area 406 for replacing the damaged physical erase unit. If there is no more normal physical erase unit in the replacement area 406 and a physical erase unit is damaged, the memory storage apparatus 100 is announced as being in a write-protect status and cannot be used for writing data anymore.

In particular, the numbers of the physical erase units in the storage area 402, the system area 404 and the replacement area 406 are various based on different flash memory modules. Additionally, it has to be understood that the grouping relationships of grouping the physical erase units into the storage area 402, the system area 404, and the replacement area 406 are dynamically changed during the operation of the memory storage apparatus 100. For example, when a physical erase unit in the storage area 402 is damaged and replaced by a physical erase unit in the replacement area 406, the physical erase unit in the replacement area 406 is associated with the storage area 402.

Referring to FIG. 7, as described above, the physical erase units of the data area 412 and the spare area 414 are alternated to store data written by the host system 1000. In the present exemplary embodiment, the memory controller 104 (or the memory management circuit 202) configures logical address LBA(0)~LBA(H) for accessing by the host system 1000.

Each logical address is composed of several sectors. For example, in the present exemplary embodiment, one logical address is composed of 4 sectors. For example, the sector LAS(0)~LSA(3) belong to the logical address LBA(0); the sector LAS(4)~LSA(7) belong to the logical address LBA(1); the sector LAS(8)~LSA(11) belong to the logical address LBA(2) and so on. However, the present invention is not limited thereto, and in another exemplary embodiment of the present invention, each logical address may be composed of 8 or 16 sectors.

For example, the memory controller 104 (or the memory management unit 202) maintains a logical address-physical address mapping table for recording the mapping relationship between the logical addresses and the physical addresses. That is, when the host system 1000 is about to access data at a sector, the memory controller 104 (or the memory management unit 202) identifies a logical address mapped to the sector, and therefore accesses data at a physical program unit mapped to this logical address.

For example, when the memory controller 104 (or the memory management circuit 202) starts to use the physical erase unit 304(0) to store data that is about to be written by the host system 1000, no matter which logical address that the data is written to by the host system 1000, the memory controller 104 (or the memory management circuit 202) writes the data to a physical program unit in the physical erase unit 304(0). When memory controller 104 (or the memory management circuit 202) starts to use the physical erase unit 304(1) to store data that is about to be written by the host system 1000, no matter which logical address that the data is written to by the host system 1000, the memory controller 104 (or the memory management circuit 202) writes the data to a physical program unit in the physical erase unit 304(1). That is to say, when the host system 1000 is about to write data, the memory controller 104 (or the memory management circuit 202) uses physical program units in a physical erase unit to write the data. Another physical erase unit where no data is stored is selected (i.e., one physical erase unit is selected from the spare area 414) only when all of the physical program units in the physical erase unit are used up, and data is continuously written to physical program units of the newly selected physical erase unit. In the exemplary embodiment, after the memory controller 104 (or the memory management circuit 202) writes the data into the physical program unit, the memory controller 104 (or the memory management circuit 202) updates the logical address-physical address mapping table to correctly record the mapping relationships between the logical addresses and the physical program units.

Figure 8:
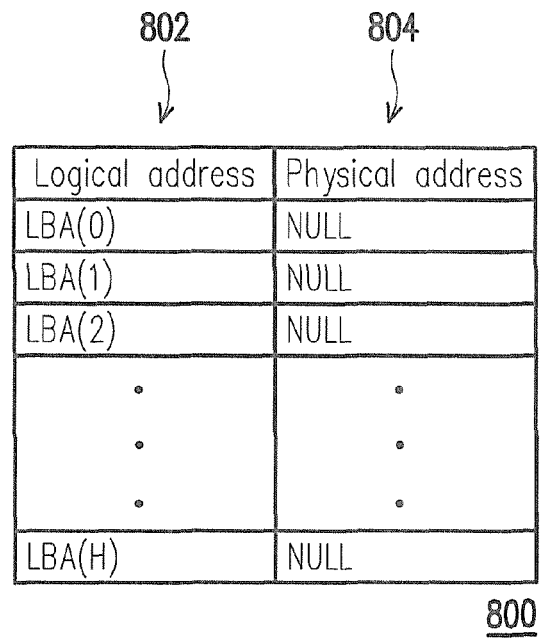
FIG. 8 is a diagram illustrating an example of a logical address-physical program unit mapping table according to an exemplary embodiment.

FIG. 8 is a diagram illustrating an example of a logical address-physical program unit mapping table according to an exemplary embodiment.

Referring to FIG. 8, the logical address-physical address mapping table 800 includes a logical address field 802 and a physical address field 804. The logical address field 802 records each reference number of the logical address and the physical address field 804 records each physical program unit mapped to the logical addresses. In the case where the memory storage apparatus 100 is brand new and never used for storing data, the physical erase units 304(0)~304(N) are associated with the spare area 414 and each field corresponding to each physical program unit mapped to the logical address in the logical address-physical address mapping table 800 is marked as void value (e.g. NULL).

Figure 9:
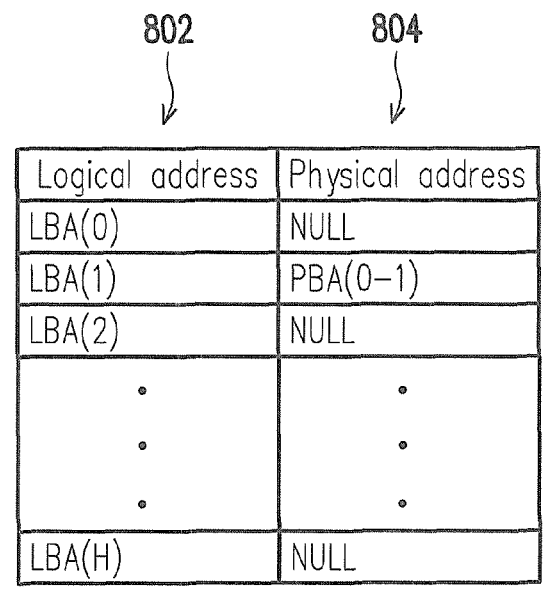
FIGS. 9~11 illustrate an example of updating the logical address-physical program unit mapping table during a write operation according to an exemplary embodiment of the present invention.
Figure 10:
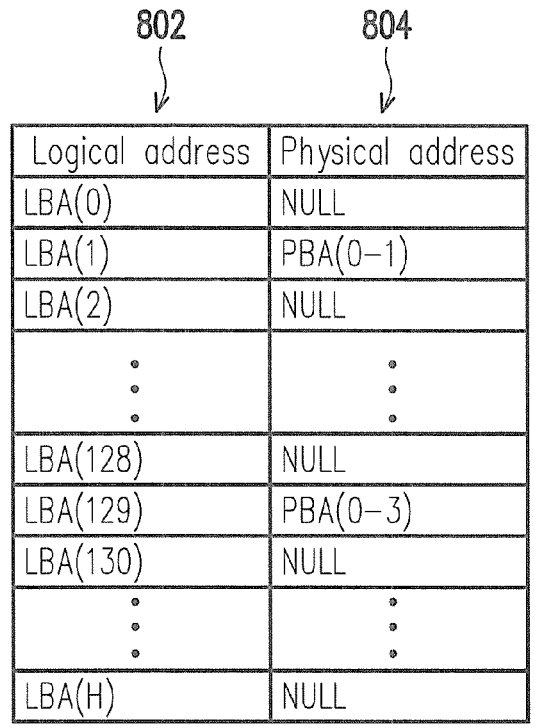
Figure 11:
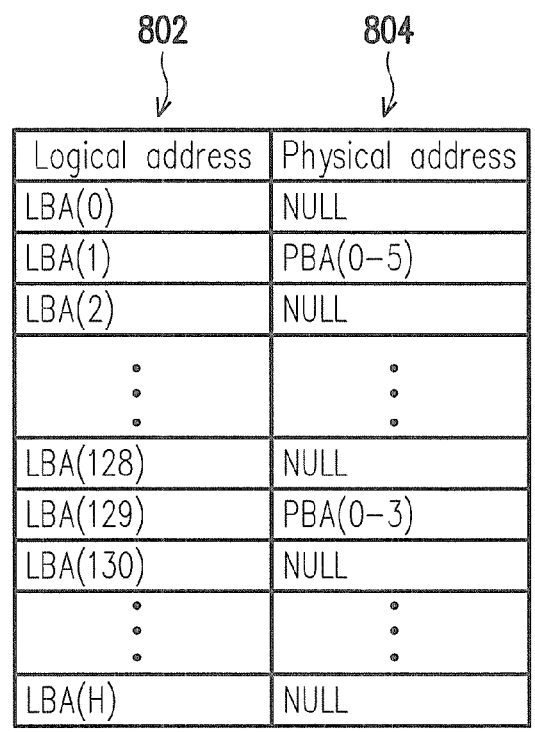

FIGS. 9~11 illustrate an example of updating the logical address-physical program unit mapping table during a write operation according to an exemplary embodiment of the present invention.

Referring to FIG. 9, when the host system 1000 is writing data into the logical address LBA(1) in the case of FIG. 8, the memory controller 104 (or memory management circuit 202) selects a physical erase unit (e.g. the physical erase unit 304(0)) from the spare area 414 and writes data to be written from the host system 1000 into the physical program unit PBA(0-1). After data writing is completed, the memory controller 104 (or the memory management circuit 202) maps the logical address LBA(1) to the physical program unit PBA(0-1) in the logical address-physical address mapping table 800.

Referring to FIG. 10, when the host system 1000 is writing data into the logical address LBA(129) in the case of FIG. 9, the memory controller 104 (or the memory management circuit 202) writes data to be written from the host system 1000 into the physical program unit PBA(0-2). In this case, the memory controller 104 (or the memory management circuit 202) maps the logical address LBA(129) to the physical program unit PBA(0-2) in the logical address-physical address mapping table 800.

Referring to FIG. 11, when the host system 1000 is writing data into the logical address LBA(1) in the case of FIG. 10, the memory controller 104 (or the memory management circuit 202) writes data to be written from the host system 1000 into the physical program unit PBA(0-3). In this case, the memory controller 104 (or the memory management circuit 202) maps the logical address LBA(1) to the physical program unit PBA(0-3) in the logical address-physical address mapping table 800.

As described above, when reading data from a physical program unit, the memory controller 104 (or the error checking and correcting circuit 256) determines whether any error bit occurs in the read data based on a corresponding ECC code and, if there are error bits in the read data, tries to correct the error bits. In particular, when the number of the error bit is smaller than the maximum correctable error bit number, besides correcting the error bits, the memory controller 104 (or the memory management circuit 202) further identifies the amount of the error bits occurring in the read data and determines whether data should be moved based on the signal from the thermal sensor 108.

For example, when the host system 1000 is about to read data stored at the logical address LBA(1) in the status shown in FIG. 11, the memory controller 104 (or the memory management circuit 202) reads data from the physical program unit PBA(0-3) and identifies an amount of error bits occurring in the read data and the current operating temperature of the memory storage apparatus 100. If the amount of the error bits occurring in the read data is larger than a first number and the current operating temperature of the memory storage apparatus 100 is not larger than the predetermined temperature, the memory controller 104 (or the memory management circuit 202), writes the corrected data into next empty physical program unit (e.g., the physical program unit) and remaps the logical address LBA(1) to the physical program unit PBA(0-4) after correcting the error bits occurring in the read data. If the amount of the error bits occurring in the read data is not larger than the first number but larger than a second number and the current operating temperature of the memory storage apparatus 100 is larger than the predetermined temperature, the memory controller 104 (or the memory management circuit 202) still writes the corrected data into next empty physical program unit (e.g., the physical program unit) and remaps the logical address LBA(1) to the physical program unit PBA(0-4) after correcting the error bits occurring in the read data. Herein, the first number is larger than the second number. For example, in the case where the maximum correctable error bit number is 48, the first number is 40 and the second number is 20.

To be specific, when the amount of the error bits occurring in data is larger than the first number and not larger than the maximum correctable error bit number, even though the error bits are correctable, the data may be lost after the data is read several times due to the higher error level of the data. In the present exemplary embodiment, the memory controller 104 (or the memory management circuit 202) correct error bits occurring in data and re-stores the corrected data into another physical program unit, thereby preventing the data from losing. In particular, when the operating temperature of the memory storage apparatus 100 is larger than the predetermined temperature, the reliability of the flash memory module 106 will be down. In this case, when the amount of the error bits occurring in data is not larger than the first number and is larger than the second number, the memory controller 104 (or the memory management circuit 202) correct error bits occurring in data and also re-stores the corrected data into another physical program unit, thereby preventing the data from losing. Herein, the operation of re-storing the corrected data into another physical program unit and adjusting the mapping relationship between logical address and physical addresses is referred to as "the read disturb preventing operation". On the contrary, if the amount of the error bits occurring in data is not larger than the second number, the memory controller 104 (or the memory management circuit 202) does not perform the read disturb preventing operation even though the operating temperature of the memory storage apparatus 100 is larger than the predetermined temperature. For instance, in this exemplary embodiment, the predetermined temperature is set to 70, which should not be construed as a limitation to the present invention. That is, when the operating temperature of the memory storage apparatus 100 is not larger than the predetermined temperature, the memory controller 104 (or the memory management circuit 202) compares the amount of error bits occurring in the read data with the first number to decide to perform or not the read disturb preventing operation (also referred to as "the first data storing mode" in the first exemplary embodiment); and when the operating temperature of the memory storage apparatus 100 is larger than the predetermined temperature, the memory controller 104 (or the memory management circuit 202) compares the amount of error bits occurring in the read data with the second number to decide to perform or not the read disturb preventing operation (also referred to as "the second data storing mode" in the first exemplary embodiment). It should be notes that in the present exemplary embodiment, the first data storing mode and the second data storing mode may be procedures of re-processing data processed by another data storing mode in a case where a condition is satisfied.

Figure 12:
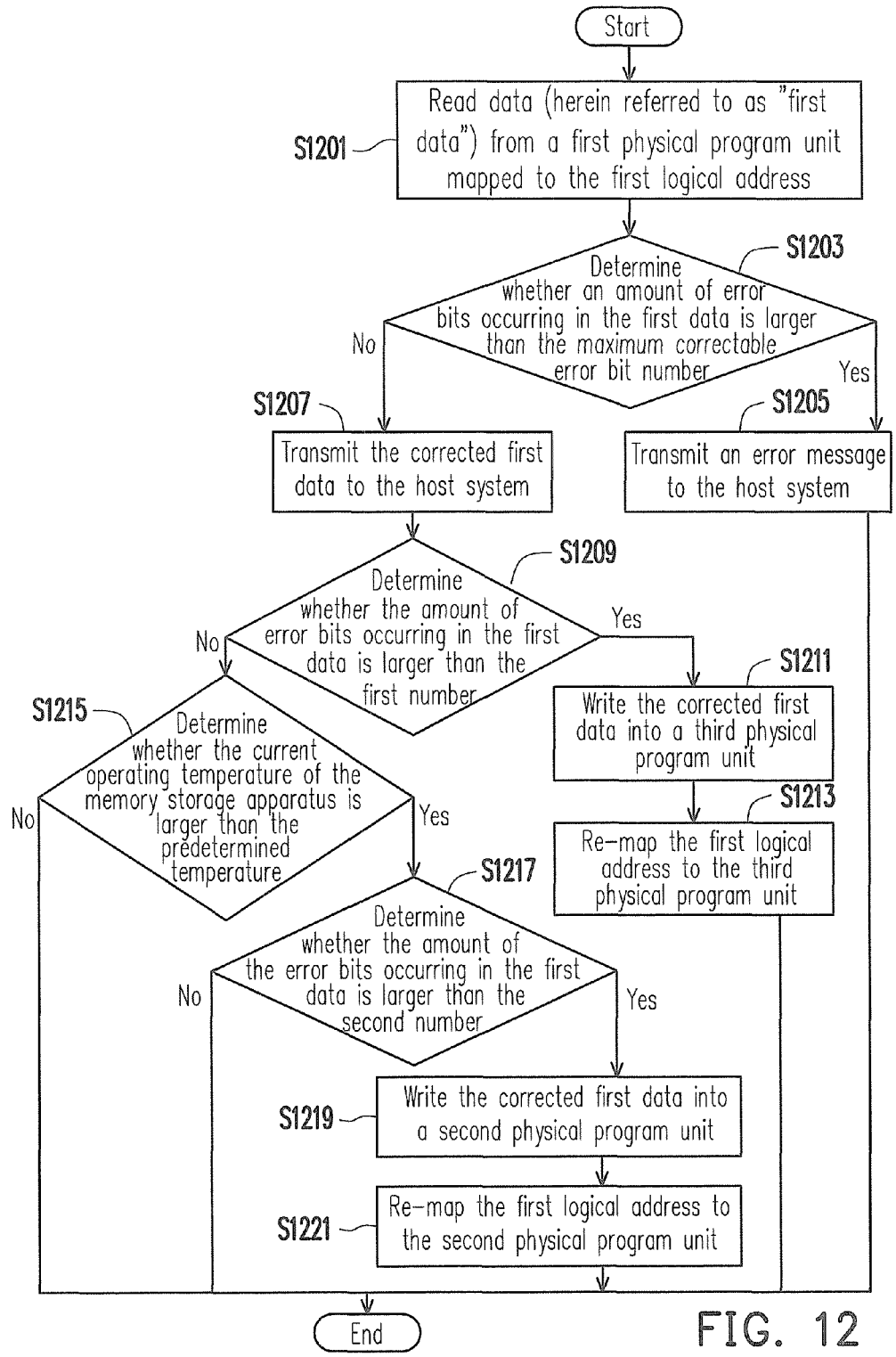
FIG. 12 is a flowchart illustrating the steps of the data storing method according to a first exemplary embodiment.

FIG. 12 is a flowchart illustrating the steps of the data storing method according to the first exemplary embodiment.

Referring to FIG. 12, when receiving a read command for accessing a first logical address, in step S1201, the memory controller 104 (or the memory management circuit 202) reads data (herein referred to as "first data") from a first physical program unit mapped to the first logical address.

In step S1203, the memory controller 104 (or the memory management circuit 202) determines whether an amount of error bits occurring in the first data is larger than the maximum correctable error bit number. To be specific, the memory controller 104 (or the error checking and correcting circuit 256) determines whether any error bit occurs in the first data based on a corresponding ECC code and, if there are error bits in the read data, tries to correct the error bits, thereby identifying the amount of the error bits occurring in the first data.

If the amount of the error bits occurring in the first data is larger than the maximum correctable error bit number, in step S1205, the memory controller 104 (or the memory management circuit 202) transmits an error message to the host system 1000. Then, the process shown in FIG. 12 is terminated.

If the amount of the error bits occurring in the first data is not larger than the maximum correctable error bit number, in step S1207, the memory controller 104 (or the memory management circuit 202) transmits the corrected first data to the host system 1000. After that, in step S1209, the memory controller 104 (or the memory management circuit 202) determines whether the amount of error bits occurring in the first data is larger than the first number.

If the amount of the error bits occurring in the first data is larger than the first number, in step S1211, the memory controller 104 (or the memory management circuit 202) writes the corrected first data into a third physical program unit. Then, in step S1213, the memory controller 104 (or the memory management circuit 202) re-maps the first logical address to the third physical program unit. For example, the memory controller 104 (or the memory management circuit 202) records information indicating that the first logical address is re-mapped to the third physical program unit in the logical address-physical address mapping table.

If the amount of the error bits occurring in the first data read from the first physical program unit is not larger than the first number, in step S1215, the memory controller 104 (or the memory management circuit 202) determines whether the current operating temperature of the memory storage apparatus 100 is larger than the predetermined temperature. If the current operating temperature of the memory storage apparatus 100 is not larger than the predetermined temperature, the process shown in FIG. 12 is terminated.

If the current operating temperature of the memory storage apparatus 100 is larger than the predetermined temperature, in step S1217, the memory controller 104 (or the memory management circuit 202) determines whether the amount of the error bits occurring in the first data is larger than the second number.

If the amount of the error bits occurring in the first data is larger than the second number, in step S1219, the memory controller 104 (or the memory management circuit 202) writes the corrected first data into a second physical program unit. Then, in step S1221, the memory controller 104 (or the memory management circuit 202) re-maps the first logical address to the second physical program unit. In the process shown in FIG. 12, the second physical program unit may be the same as or different from the third physical program unit.

If the amount of the error bits occurring in the first data is not larger than the second number, the process shown in FIG. 12 is terminated.

Second Exemplary Embodiment

The structure of the memory storage apparatus described in the second exemplary embodiment is substantially the same as that of the memory storage apparatus described in the first exemplary embodiment, while the difference therebetween lies in that the memory controller (or the memory management circuit) described in the second exemplary embodiment writes data with different write modes based on the operating temperature of the memory storage apparatus. The reference number for the hardware elements disclosed in the first exemplary embodiment is further utilized hereinafter to elaborate the difference between the first and second exemplary embodiments.

In the second exemplary embodiment, the flash memory module 106 is a MLC NAND flash memory module and the program units of each physical erase unit may be classified into lower physical program units (also referred to as fast physical program units) and upper physical program units (also referred to as slow physical program units) based on the access speeds thereof. For example, the physical program units PBA(0-1), PBA(0-3), PBA(0-5), ..., PBA(0-(K−1)) of the physical erase unit 304(0) are the lower physical program units and the physical program units PBA(0-2), PBA(0-4), PBA(0-6), ..., PBA(0-K) of the physical erase unit 304(0) are the upper physical program units. However, it should be noted that in another exemplary embodiment, the flash memory module 106 may be a TLC NAND flash memory module or other flash memory module having more levels. For example, the flash memory module 106 is a TLC NAND flash memory module and the program units of each physical erase unit may be classified into lower physical program units (also referred to as fast physical program units), middle physical program units (also refereed to as slower physical program units) and upper physical program units (also referred to as slowest physical program units) based on the access speeds thereof.

In particular, when writing data into a physical program unit, the memory controller 104 (or the memory management circuit 202) identifies the operating temperature of the memory storage apparatus 100. If the operating temperature of the memory storage apparatus 100 is not larger than the predetermined temperature, the memory controller 104 (or the memory management circuit 202) writes the data into the flash memory module 106 with a second data storing mode. For instance, in this exemplary embodiment, the predetermined temperature is set to 70, which should not be construed as a limitation to the present invention.

In the first data storing mode of the second exemplary embodiment, the memory controller 104 (or the memory management circuit 202) uses lower physical program units and upper physical program units to store data written by the host system 1000. And, in the second data storing mode of the second exemplary embodiment, the memory controller 104 (or the memory management circuit 202) uses only lower physical program units to store data written by the host system 1000 without using upper physical program units. That is, in the first data storing mode, the lower and upper physical program units of the flash memory module 106 are selected for storing data, and in the second data storing mode, only the lower physical program units of the flash memory module 106 are selected for storing data. In particular, the coupling effect may occur between the lower physical program units and the upper physical program units. For example, when some errors occur in data stored in an upper physical program unit, data stored in a corresponding lower physical program unit may be lost. Therefore, the reliability of writing data with the second data storing mode is better than that with the first data storing mode.

It should be noted that the present invention is limited to the MLC NAND flash memory module. In a case where the TCL NAND flash memory module is applied, the memory controller 104 (or the memory management circuit 202) uses lower physical program units middle physical program units and upper physical program units to store data written by the host system 1000 in the first data storing mode, and the memory controller 104 (or the memory management circuit 202) uses only lower physical program units to store data written by the host system 1000 without using middle and upper physical program units in the second data storing mode.

A manner of storing data by using lower and upper physical program units (i.e., the first data storing mode) has described with FIGS. 9~11, and thus not repeated herein.

Figure 13:
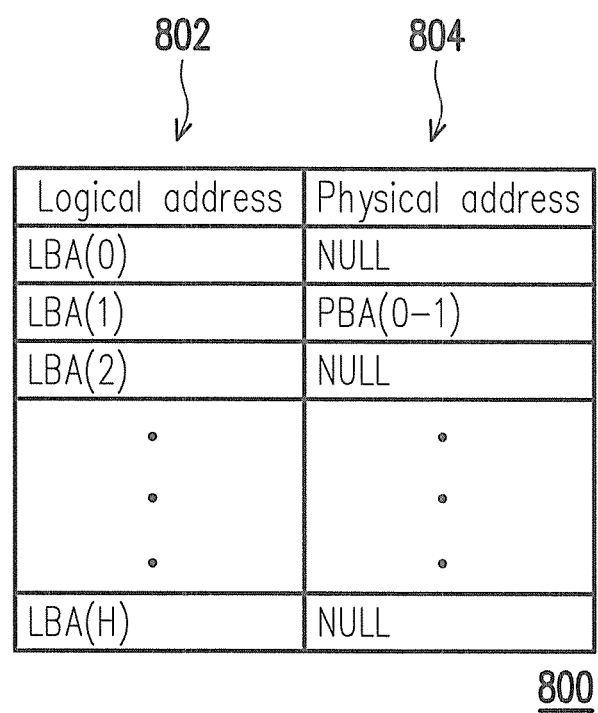
FIGS. 13~15 illustrate an example of updating the logical address-physical program unit mapping table during a write operation with a second mode according to an exemplary embodiment of the present invention.
Figure 14:
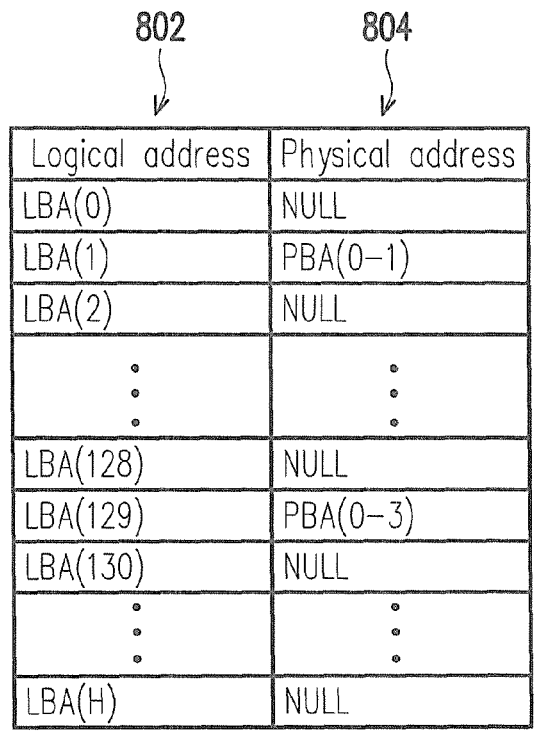
Figure 15:
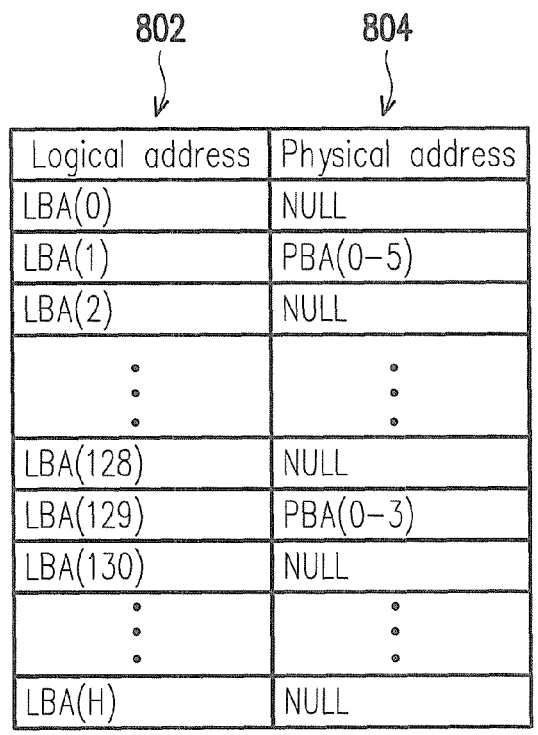

FIGS. 13~15 illustrate an example of updating the logical address-physical program unit mapping table during a write operation with a second data storing mode according to an exemplary embodiment of the present invention.

Referring to FIG. 13, when the host system 1000 is writing data into the logical address LBA(1) in the case of FIG. 8, the memory controller 104 (or memory management circuit 202) selects a physical erase unit (e.g., the physical erase unit 304(0)) from the spare area 414 and writes data to be written by the host system 1000 into the physical program unit PBA (0-1). After data writing is completed, the memory controller 104 (or the memory management circuit 202) maps the logical address LBA(1) to the physical program unit PBA(0-1) in the logical address-physical address mapping table 800.

Referring to FIG. 14, when the host system 1000 is writing data into the logical address LBA(129) in the case of FIG. 13, the memory controller 104 (or the memory management circuit 202) writes data to be written by the host system 1000 into the physical program unit PBA(0-3). In this case, the memory controller 104 (or the memory management circuit 202) maps the logical address LBA(129) to the physical program unit PBA(0-3) in the logical address-physical address mapping table 800.

Referring to FIG. 15, when the host system 1000 is writing data into the logical address LBA(1) in the case of FIG. 14, the memory controller 104 (or the memory management circuit 202) writes data to be written by the host system 1000 into the physical program unit PBA(0-5). In this case, the memory controller 104 (or the memory management circuit 202) maps the logical address LBA(1) to the physical program unit PBA (0-5) in the logical address-physical address mapping table 800.

In the operations shown in FIGS. 13-15, the memory controller 104 (or the memory management circuit 202) selects lower physical program units (i.e., the physical program units PBA(0-1), PBA(0-3) and PBA(0-5)) to write data without using upper physical program units (i.e., the second data storing mode).

Figure 16:
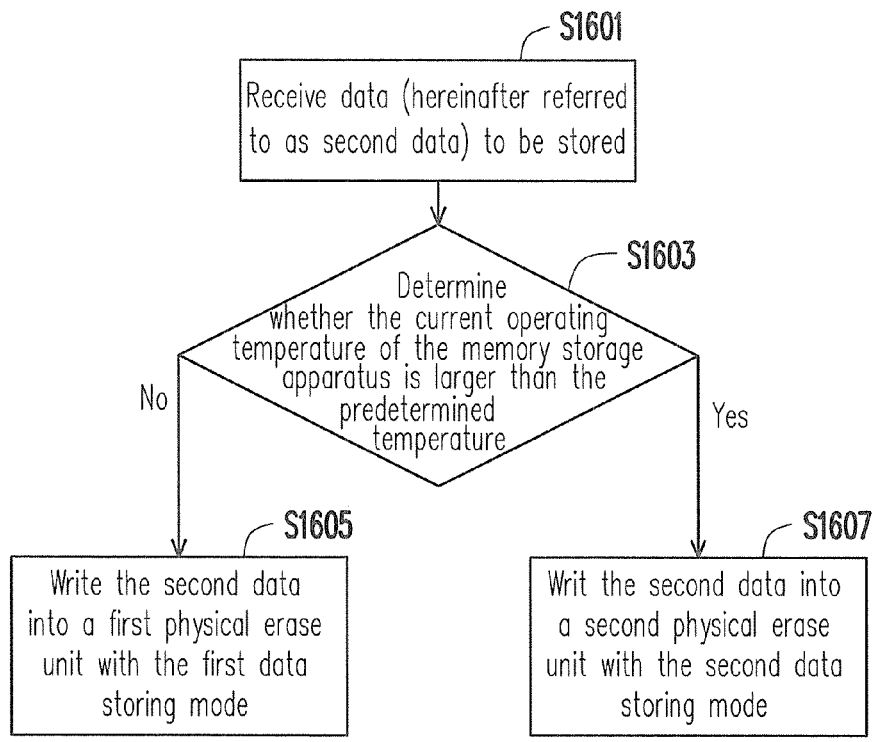
FIG. 16 is a flowchart illustrating the steps of the data storing method according to a second exemplary embodiment.

FIG. 16 is a flowchart illustrating the steps of the data storing method according to a second exemplary embodiment.

Referring to FIG. 16, in step S1601, the memory controller 104 (or the memory management circuit 202) receives data (hereinafter referred to as second data) to be stored.

In step S1603, the memory controller 104 (or the memory management circuit 202) determines whether the current operating temperature of the memory storage apparatus 100 is larger than the predetermined temperature. To be specific, the memory controller 104 (or the memory management circuit 202) identifies the current operating temperature of the memory storage apparatus 100 according to the signal sent from the thermal sensor 108.

If the current operating temperature of the memory storage apparatus 100 is not larger than the predetermined temperature, in step S1605, the memory controller 104 (or the memory management circuit 202) writes the second data into a first physical erase unit (e.g., the physical erase unit 304(0)) with the first data storing mode, wherein the lower and upper physical program units of the first physical erase unit are used for storing data.

If the current operating temperature of the memory storage apparatus 100 is larger than the predetermined temperature, in step S1607, the memory controller 104 (or the memory management circuit 202) writs the second data into a second physical erase unit (e.g., the physical erase unit 304(1)) with the second data storing mode. In the second data storing mode, the memory controller 104 (or the memory management circuit 202) uses the lower physical program units of the second physical erase unit to store data without using the upper physical program units of the second physical erase unit.

Third Embodiment

The structure of the memory storage apparatus described in the third exemplary embodiment is substantially the same as that of the memory storage apparatus described in the first exemplary embodiment, while the difference therebetween lies in that the memory controller (or the memory management circuit) described in the third exemplary embodiment performs a wear leveling operation with different frequencies based on the operating temperature of the memory storage apparatus. The reference number for the hardware elements disclosed in the first exemplary embodiment is further utilized hereinafter to elaborate the difference between the first and third exemplary embodiments.

Generally speaking, the physical erase units that are frequently switched between the data area 412 and the spare area 414 are called dynamic physical erase units. In addition, some data may be written in the data area 412 for a long time without being moved. For example, the user may store 100 MP3 songs of his favorite without deleting or renewing the songs thereafter. Physical erase units which store this kind of data are generally called static physical erase units. Static physical erase units are rarely moved or updated, and therefore the number of erasing times is relatively low (i.e. the degree of wear is lower). In this exemplary embodiment, the memory controller 104 (or the memory management circuit 202) performs physical erase unit switching between the data area 412 and the spare area 414, and thereby alternates to use the rarely used physical erase units in the data area 412, so as to make uniform the use and wear of the physical erase units effectively. Herein, the operation of switching the physical erase units of the data area 412 with the physical erase units of the spare area 414 is referred to as "the wear leveling operation".

For example, in the wear leveling operation, the memory controller 104 (or the memory management circuit 202) selects a physical erase unit having the smallest erase count (e.g., the physical erase unit 304(0)) among the physical erase units of the data area 412; selects a physical erase unit having the largest erase count (e.g., the physical erase unit 304(D+1)) among the physical erase units of the spare area 414; moving data stored in the physical erase unit 304(0) to the physical erase unit 304(D+1); and re-mapping logical addresses, which are mapped to the physical program units of the physical erase unit 304(0), to the physical program units of the physical erase unit 304(D+1).

Generally, the memory controller 104 (or the memory management circuit 202) records the number of performing the erasing operation on the flash memory module 106. Every when the number of performing the erasing operation on the flash memory module 106 reaches a predetermined threshold, the memory controller 104 (or the memory management circuit 202) performs the wear leveling operation. For example, every when the erasing operation is performed 1000 times on the flash memory module 106, the memory controller 104 (or the memory management circuit 202) performs the wear leveling operation once.

In particular, in the third exemplary embodiment, the memory controller 104 (or the memory management circuit 202) identifies the operating temperature of the memory storage apparatus 100. If the operating temperature of the memory storage apparatus 100 is not larger than the predetermined temperature, the memory controller 104 (or the memory management circuit 202) performs the wear leveling operation with a first frequency (i.e., every when the number of performing the erasing operation reaches the predetermined threshold, the wear leveling operation is performed once). If the operating temperature of the memory storage apparatus 100 is larger than the predetermined temperature, the memory controller 104 (or the memory management circuit 202) performs the wear leveling operation with a second frequency (i.e., every when the number of performing the erasing operation reaches another threshold, the wear leveling operation is performed once). In the third exemplary embodiment, the operation of performing the wear leveling operation with the first frequency is referred to as "the first data storing mode" and the operation of performing the wear leveling operation with the second frequency is referred to as "the second data storing mode". In this exemplary embodiment, the first frequency is smaller than the second frequency. For example, the second frequency means that every when the erasing operation is performed 500 times, the memory controller 104 (or the memory management circuit 202) performs the wear leveling operation once. However, it is noted that the present invention is not limited thereto. In another exemplary embodiment, the second frequency may be smaller than the first frequency.

Figure 17:
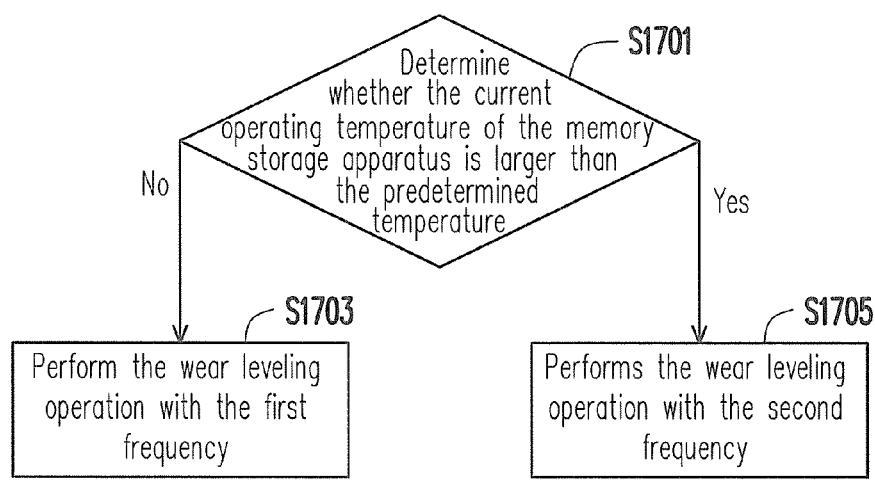
FIG. 17 is a flowchart illustrating the steps of the data storing method according to a third exemplary embodiment.

FIG. 17 is a flowchart illustrating the steps of the data storing method according to the third exemplary embodiment.

Referring to FIG. 17, in step S1701, the memory controller 104 (or the memory management circuit 202) determines whether the current operating temperature of the memory storage apparatus 100 is larger than the predetermined temperature. To be specific, the memory controller 104 (or the memory management circuit 202) identifies the current operating temperature of the memory storage apparatus 100 according to the signal sent from the thermal sensor 108.

If the current operating temperature of the memory storage apparatus 100 is not larger than the predetermined temperature, in step S1703, the memory controller 104 (or the memory management circuit 202) performs the wear leveling operation with the first frequency.

If the current operating temperature of the memory storage apparatus 100 is larger than the predetermined temperature, in step S1705, the memory controller 104 (or the memory management circuit 202) performs the wear leveling operation with the second frequency.

For example, when performing the wear leveling operation, the memory controller 104 (or the memory management circuit 202) selects a physical erase unit (hereinafter referred to as the third physical erase unit), that have been written with data, from the physical erase units of the flash memory module 106 and selects a physical erase unit (hereinafter referred to as the fourth physical erase unit), that have not been written with data, from the physical erase units of the flash memory module 106, wherein the erase count of the fourth physical program unit is larger than that of the third physical program unit. Then, the memory controller 104 (or the memory management circuit 202) moves data stored in the third physical program unit to the fourth physical erase unit and re-maps logical addresses, which are mapped to the physical program units of the third physical program unit, to the physical program units of the fourth physical erase unit.

Fourth Exemplary Embodiment

The structure of the memory storage apparatus described in the fourth exemplary embodiment is substantially the same as that of the memory storage apparatus described in the first exemplary embodiment, while the difference therebetween lies in that the memory controller (or the memory management circuit) described in the first exemplary embodiment performs the read disturb preventing operation when the read command is executed and the memory controller (or the memory management circuit) described in the fourth exemplary embodiment performs the read disturb preventing operation with different frequencies based on the operating temperature of the memory storage apparatus.

In the present exemplary embodiment, the memory controller 104 (or the memory management circuit 202) performs the read disturb preventing operation with an interval time during the operation of the memory storage apparatus 100. In particular, if the operating temperature of the memory storage apparatus 100 is larger than the predetermined temperature, the reliability of the flash memory module 106 will be down. Therefore, in the present exemplary embodiment, if the operating temperature of the memory storage apparatus 100 is larger than the predetermined temperature, the memory controller 104 (or the memory management circuit 202) performs the read disturb preventing operation more frequently.

For example, the memory controller 104 (or the memory management circuit 202) monitors the operating temperature of the memory storage apparatus 100. If the current operating temperature of the memory storage apparatus 100 is not larger than the predetermined temperature, the memory controller 104 (or the memory management circuit 202) performs the read disturb preventing operation with a third frequency. If the current operating temperature of the memory storage apparatus 100 is larger than the predetermined temperature, the memory controller 104 (or the memory management circuit 202) performs the read disturb preventing operation with a fourth frequency. In this exemplary embodiment, the fourth frequency is larger than the fourth frequency. For example, the third frequency means that every when the memory storage apparatus 100 operates one hour, the memory controller 104 (or the memory management circuit 202) performs the read disturb preventing operation once and the fourth frequency means that every when the memory storage apparatus 100 operates a half hour, the memory controller 104 (or the memory management circuit 202) performs the read disturb preventing operation once. In particular, in another exemplary embodiment, if the operating temperature of the memory storage apparatus 100 is not larger than the predetermined temperature, the memory controller 104 (or the memory management circuit 202) may not performs the read disturb preventing operation periodically (i.e., the third frequency may be set to 0). In the fourth exemplary embodiment, the operation of performing the read disturb preventing operation with the third frequency is referred to as "the first data storing mode" and the operation of performing the read disturb preventing operation with the fourth frequency is referred to as "the second data storing mode".

Figure 18:
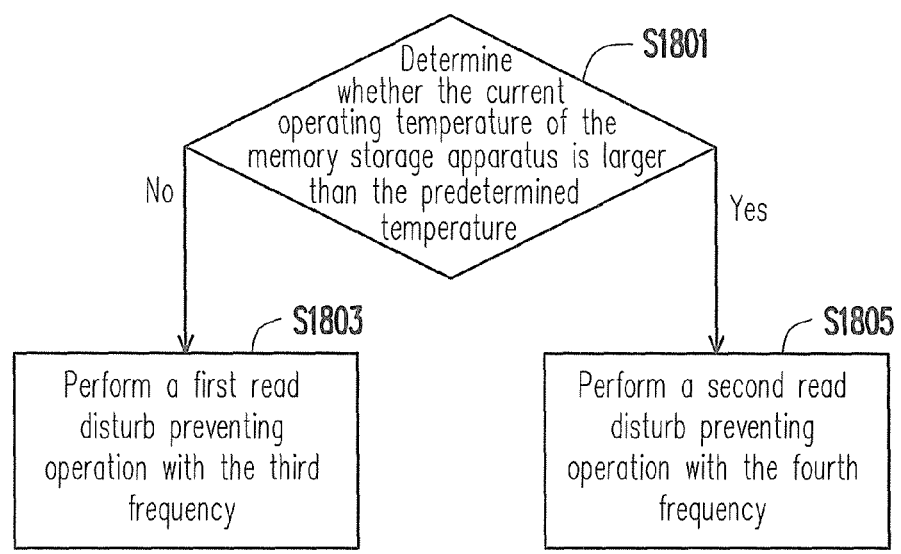
FIG. 18 is a flowchart illustrating the steps of the data storing method according to a fourth exemplary embodiment.

FIG. 18 is a flowchart illustrating the steps of the data storing method according to the fourth exemplary embodiment.

Referring to FIG. 18, in step S1801, the memory controller 104 (or the memory management circuit 202) determines whether the current operating temperature of the memory storage apparatus 100 is larger than the predetermined temperature. To be specific, the memory controller 104 (or the memory management circuit 202) identifies the current operating temperature of the memory storage apparatus 100 according to the signal sent from the thermal sensor 108.

If the current operating temperature of the memory storage apparatus 100 is not larger than the predetermined temperature, in step S1803, the memory controller 104 (or the memory management circuit 202) performs a first read disturb preventing operation with the third frequency.

For example, in the step S1803, when the first read disturb preventing operation is performed, the memory controller 104 (or the memory management circuit 202) read data (hereinafter referred to as "the second data") from a physical program unit (hereinafter referred to as "the third physical program unit") among the physical program units, that have been written with data, and determines whether an amount of error bits occurring in the second data is larger than a third number. If the amount of the error bits occurring in the second data is larger than the third number, the memory controller 104 (or the memory management circuit 202) writes the corrected second data into an empty physical program unit (hereinafter referred to as "the fourth physical program unit") and re-map a logical address, which is mapped originally to the third physical program unit, to the fourth physical program unit.

If the current operating temperature of the memory storage apparatus 100 is larger than the predetermined temperature, in step S1805, the memory controller 104 (or the memory management circuit 202) performs a second read disturb preventing operation with the fourth frequency.

For example, in the step S1805, when the second read disturb preventing operation is performed, the memory controller 104 (or the memory management circuit 202) read data (hereinafter referred to as "the third data") from a physical program unit (hereinafter referred to as "the fifth physical program unit") among the physical program units, that have been written with data, and determines whether an amount of error bits occurring in the third data is larger than a fourth number. If the amount of the error bits occurring in the third data is larger than the fourth number, the memory controller 104 (or the memory management circuit 202) writes the corrected third data into an empty physical program unit (hereinafter referred to as "the sixth physical program unit") and re-map a logical address, which is mapped originally to the fifth physical program unit, to the sixth physical program unit.

Herein, the third number is larger than the fourth number. For example, in the case where the maximum correctable error bit number is 48, the third number is 40 and the fourth number is 20.

It should be noted that various operation performed based on the operating temperature of the memory storage apparatus are described independently with several exemplary embodiments. However, at least two of these operations may be implemented together.

Based on the above, the data storing method, the memory controller, and the memory storage apparatus are capable of storing data with a suitable mode according to the temperature of the memory storage apparatus, thereby increasing the reliability of storing data and preventing data loss. The previously described exemplary embodiments of the present invention have the advantages aforementioned, wherein the advantages aforementioned not required in all versions of the invention.

Although the invention has been described with reference to the above embodiments, it will be apparent to one of ordinary skill in the art that modifications to the described embodiments may be made without departing from the spirit of the invention. Therefore, the protecting range of the invention falls in the appended claims.

What is claimed is:

1. A data storing method, for a memory storage apparatus including a flash memory module, the flash memory module has a plurality of physical erase unit and each of the physical erase unit has a plurality of physical program unit, the data storing method comprising:

detecting an operating temperature of the memory storage apparatus through a thermal sensor;
   determining whether the operating temperature of the memory storage apparatus is larger than a predetermined temperature;
   using a first data storing mode to program the flash memory module if the operating temperature of the memory storage apparatus is not larger than the predetermined temperature;
   using a second data storing mode to program the flash memory module if the operating temperature of the memory storage apparatus is larger than the predetermined temperature,
   wherein the first data storing mode is different from the second data storing mode;
   writing first data into a first physical program unit among the physical program units of the physical erase units;
   reading the first data from the first physical program unit and correcting the read first data; and
   identifying an amount of error bits occurring in the first data read from the first physical program unit,
   wherein the step of using the second data storing mode to program the flash memory module comprises:
      determining whether the amount of the error bits occurring in the first data read from the first physical program unit is larger than a second number and smaller than a first number;
      if the amount of the error bits occurring in the first data read from the first physical program unit is larger than the second number and smaller than the first number, writing the corrected first data into a second physical program unit among the physical program units of the physical erase units and re-map a logical address mapped to the first physical program unit to the second physical program unit, and
   wherein the step of using the first data storing mode to program the flash memory module comprises:
      determining whether the amount of the error bits occurring in the first data read from the first physical program unit is larger than the first number; and
      if the amount of the error bits occurring in the first data read from the first physical program unit is larger than the first number, writing the corrected first data into a third physical program unit among the physical program units of the physical erase units and re-map a logical address mapped to the first physical program unit to the third physical program unit,
   wherein the second number is smaller than the first number.

2. A data storing method, for a memory storage apparatus including a flash memory module, the flash memory module has a plurality of physical erase unit and each of the physical erase unit has a plurality of physical program unit, the data storing method comprising:

detecting an operating temperature of the memory storage apparatus through a thermal sensor;

determining whether the operating temperature of the memory storage apparatus is larger than a predetermined temperature;

using a first data storing mode to program the flash memory module if the operating temperature of the memory storage apparatus is not larger than the predetermined temperature;

using a second data storing mode to program the flash memory module if the operating temperature of the memory storage apparatus is larger than the predetermined temperature, wherein the first data storing mode is different from the second data storing mode, wherein the step of using the first data storing mode to program the flash memory module comprises performing a wear leveling operation with a first frequency and the step of using the second data storing mode to program the flash memory module comprises performing the wear leveling operation with a second frequency, wherein the wear leveling operation includes:
  selecting a third physical erase unit among the physical erase units, wherein the third physical erase unit has been written with data and a plurality of logical address are mapped respectively to the physical program units of the third physical erase unit;
  selecting a fourth physical erase unit among the physical erase units, wherein the fourth physical erase unit has not been written with valid data; and
  moving data stored in the third physical erase unit to the fourth physical erase unit and re-mapping the logical addresses to the physical program units of the fourth physical erase unit, wherein an erase count of the fourth physical erase unit is larger than an erase count of the third physical erase unit.

3. The data storing method according to claim 2, wherein the first frequency is larger than the second frequency.

4. The data storing method according to claim 2, wherein the second frequency is larger than the first frequency.

5. A memory controller, for controlling a memory storage apparatus having a flash memory module is provided, wherein the flash memory module has a plurality of physical erase unit and each of the physical erase unit has a plurality of physical program unit, the memory controller comprising:
  a host interface, configured to couple to a host system;
  a memory interface, configured to be coupled to the flash memory module;
  an error checking and correcting circuit; and
  a memory management circuit, coupled to the host interface, the memory interface, and the error checking and correcting circuit,
  wherein the memory management circuit is configured to detect an operating temperature of the memory storage apparatus and determine whether the operating temperature of the memory storage apparatus is larger than a predetermined temperature,
  wherein the memory management circuit is further configured to use a first data storing mode to program the flash memory module if the operating temperature of the memory storage apparatus is not larger than the predetermined temperature; and
  wherein the memory management circuit is further configured to use a second data storing mode to program the flash memory module if the operating temperature of the memory storage apparatus is larger than the predetermined temperature, wherein the first data storing mode is different from the second data storing mode,
  wherein the memory management circuit is further configured to write first data into a first physical program unit among the physical program units of the physical erase units,
  wherein the memory management circuit is further configured to read the first data from the first physical program unit and the error checking and correcting circuit corrects the first data read from the first physical program unit,
  wherein the memory management circuit is further configured to identify an amount of error bits occurring in the first data read from the first physical program unit,
  wherein in the second data storing mode, the memory management circuit determines whether an amount of error bits occurring in the first data read from the first physical program unit is larger than a second number and smaller than a first number, and if the amount of the error bits occurring in the first data read from the first physical program unit is larger than the second number and smaller than the first number, the memory management circuit writes the corrected first data into a second physical program unit among the physical program units of the physical erase units and re-maps a logical address mapped to the first physical program unit to the second physical program unit,
  wherein in the first data storing mode, the memory management circuit determines whether the amount of the error bits occurring in the first data read from the first physical program unit is larger than the first number, and if the amount of the error bits occurring in the first data read from the first physical program unit is larger than the first number, the memory management circuit writes the corrected first data into a third physical program unit among the physical program units of the physical erase units and re-maps a logical address mapped to the first physical program unit to the third physical program unit,
  wherein the second number is smaller than the first number.

6. A memory controller, for controlling a memory storage apparatus having a flash memory module is provided, wherein the flash memory module has a plurality of physical erase unit and each of the physical erase unit has a plurality of physical program unit, the memory controller comprising:
  a host interface, configured to couple to a host system;
  a memory interface, configured to be coupled to the flash memory module;
  an error checking and correcting circuit; and
  a memory management circuit, coupled to the host interface, the memory interface, and the error checking and correcting circuit,
  wherein the memory management circuit is configured to detect an operating temperature of the memory storage apparatus and determine whether the operating temperature of the memory storage apparatus is larger than a predetermined temperature,
  wherein the memory management circuit is further configured to use a first data storing mode to program the flash memory module if the operating temperature of the memory storage apparatus is not larger than the predetermined temperature; and
  wherein the memory management circuit is further configured to use a second data storing mode to program the flash memory module if the operating temperature of the memory storage apparatus is larger than the predetermined temperature, wherein the first data storing mode is different from the second data storing mode, wherein in the first data storing mode, the memory management circuit performs a wear leveling operation with a first frequency, wherein in the operation of using the second data storing mode to program the flash memory module, the memory management circuit performs the wear leveling operation with a second frequency, wherein in the operation of performing the wear leveling operation, the memory management circuit selects a third physical erase unit among the physical erase units, wherein the third physical erase unit has been written with data and a plurality of logical address are mapped respectively to the physical program units of the third physical erase unit;

wherein in the operation of performing the wear leveling operation, the memory management circuit selects a fourth physical erase unit among the physical erase units, wherein the fourth physical erase unit has not been written with valid data, wherein in the operation of performing the wear leveling operation, the memory management circuit moves data stored in the third physical erase unit to the fourth physical erase unit, wherein an erase count of the fourth physical erase unit is larger than an erase count of the third physical erase unit, wherein in the operation of performing the wear leveling operation, the memory management circuit re-maps the logical addresses to the physical program units of the fourth physical erase unit.

7. The memory controller according to claim 6, wherein the first frequency is larger than the second frequency.

8. The memory controller according to claim 6, wherein the second frequency is larger than the first frequency.

9. A memory storage apparatus, comprising:
a connector, configured to couple to a host system;
a flash memory module, having a plurality of physical erase unit, wherein each of the physical erase unit has a plurality of physical program unit;
a memory controller, coupled to the connector and the flash memory module; and
a thermal sensor, coupled to the memory controller and configured to detect an operating temperature,
wherein the memory controller is configured to determine whether the operating temperature of the memory storage apparatus is larger than a predetermined temperature,
wherein the memory controller uses a first data storing mode to program the flash memory module if the operating temperature of the memory storage apparatus is not larger than a predetermined temperature,
wherein the memory controller is further configured to use a second data storing mode to program the flash memory module if the operating temperature of the memory storage apparatus is larger than the predetermined temperature, wherein the first data storing mode is different from the second data storing mode,
wherein the memory controller is further configured to write first data into a first physical program unit among the physical program units of the physical erase units,
wherein the memory controller is further configured to read the first data from the first physical program unit and the error checking and correcting circuit corrects the first data read from the first physical program unit,
wherein the memory controller is further configured to identify an amount of error bits occurring in the first data read from the first physical program unit, wherein in the second data storing mode, the memory controller determines whether an amount of error bits occurring in the first data read from the first physical program unit is larger than a second number and smaller than a first number, and if the amount of the error bits occurring in the first data read from the first physical program unit is larger than the second number and smaller than the first number, the memory management circuit writes the corrected first data into a second physical program unit among the physical program units of the physical erase units and re-maps a logical address mapped to the first physical program unit to the second physical program unit, wherein in the first data storing mode, the memory controller determines whether the amount of the error bits occurring in the first data read from the first physical program unit is larger than the first number, and if the amount of the error bits occurring in the first data read from the first physical program unit is larger than the first number, the memory management circuit writes the corrected first data into a third physical program unit among the physical program units of the physical erase units and re-maps a logical address mapped to the first physical program unit to the third physical program unit, wherein the second number is smaller than the first number.

10. A memory storage apparatus, comprising:
a connector, configured to couple to a host system;
a flash memory module, having a plurality of physical erase unit, wherein each of the physical erase unit has a plurality of physical program unit;
a memory controller, coupled to the connector and the flash memory module; and
a thermal sensor, coupled to the memory controller and configured to detect an operating temperature,
wherein the memory controller is configured to determine whether the operating temperature of the memory storage apparatus is larger than a predetermined temperature,
wherein the memory controller uses a first data storing mode to program the flash memory module if the operating temperature of the memory storage apparatus is not larger than a predetermined temperature,
wherein the memory controller is further configured to use a second data storing mode to program the flash memory module if the operating temperature of the memory storage apparatus is larger than the predetermined temperature, wherein the first data storing mode is different from the second data storing mode,
wherein in the first data storing mode, the memory management circuit performs a wear leveling operation with a first frequency,
wherein in the operation of using the second data storing mode to program the flash memory module, the memory controller performs the wear leveling operation with a second frequency,
wherein in the operation of performing the wear leveling operation, the memory controller selects a third physical erase unit among the physical erase units, wherein the third physical erase unit has been written with data and a plurality of logical address are mapped respectively to the physical program units of the third physical erase unit,
wherein in the operation of performing the wear leveling operation, the memory controller selects a fourth physical erase unit among the physical erase units, wherein the fourth physical erase unit has not been written with valid data, wherein in the operation of performing the wear leveling operation, the memory controller moves data stored in the third physical erase unit to the fourth physical erase unit, wherein an erase count of the fourth physical erase unit is larger than an erase count of the third physical erase unit, wherein in the operation of performing the wear leveling operation, the memory controller re-maps the logical addresses to the physical program units of the fourth physical erase unit.

11. The memory storage apparatus according to claim 10, wherein the first frequency is larger than the second frequency.

12. The memory storage apparatus according to claim 10, wherein the second frequency is larger than the first frequency.

13. A data storing method, for a memory storage apparatus including a flash memory module, the flash memory module has a plurality of physical erase unit and each of the physical erase unit has a plurality of physical program unit, the data storing method comprising:

detecting an operating temperature of the memory storage apparatus through a thermal sensor;

determining whether the operating temperature of the memory storage apparatus is larger than a predetermined temperature;

using a first data storing mode to program the flash memory module if the operating temperature of the memory storage apparatus is not larger than the predetermined temperature; and using a second data storing mode to program the flash memory module if the operating temperature of the memory storage apparatus is larger than the predetermined temperature, wherein the first data storing mode is different from the second data storing mode, wherein the physical program units of each of the physical erase units includes a plurality of lower physical program units and a plurality of upper physical program units and a speed of writing data into the lower physical program units is larger than a speed of writing data into the upper physical program units, wherein the step of using the first data storing mode to program the flash memory module comprises: receiving second data from a host system and writing the second data into a first physical erase unit among the physical erase units, wherein the lower physical program units and the upper physical program of the first physical erase unit are used to write data in the first data storing mode, wherein the step of using the second data storing mode to program the flash memory module comprises: receiving the second data from the host system and writing the second data into a second physical erase unit among the physical erase units, wherein the lower physical program units of the second physical erase unit are used to write data and the upper physical program units of the second physical erase unit are not used to write data in the second data storing mode.

14. A data storing method, for a memory storage apparatus including a flash memory module, the flash memory module has a plurality of physical erase unit and each of the physical erase unit has a plurality of physical program unit, the data storing method comprising:

detecting an operating temperature of the memory storage apparatus through a thermal sensor;

determining whether the operating temperature of the memory storage apparatus is larger than a predetermined temperature;

using a first data storing mode to program the flash memory module if the operating temperature of the memory storage apparatus is not larger than the predetermined temperature;

using a second data storing mode to program the flash memory module if the operating temperature of the memory storage apparatus is larger than the predetermined temperature, wherein the first data storing mode is different from the second data storing mode, wherein the step of using the first data storing mode to program the flash memory module comprises: performing a first read disturb preventing operation with a third frequency, wherein the step of using the second data storing mode to program the flash memory module comprises: performing a second read disturb preventing operation with a fourth frequency, wherein the fourth frequency is larger than the third frequency, wherein the first read disturb preventing operation includes:

reading second data from a third physical program unit among the physical program units of the physical erase units and correcting the second data;

determining whether the amount of error bits occurring in the second data read from the third physical program unit is larger than a third number; and if the amount of the error bits occurring in the second data read from the third physical program unit is larger than the third number, writing the corrected second data into a fourth physical program unit among the physical program units of the physical erase units and re-map a logical address mapped to the third physical program unit to the fourth physical program unit, wherein the second read disturb preventing operation includes:

reading third data from a fifth physical program unit among the physical program units of the physical erase units and correcting the third data;

determining whether the amount of error bits occurring in the third data read from the fifth physical program unit is larger than a fourth number; and if the amount of the error bits occurring in the third data read from the fifth physical program unit is larger than the fourth number, writing the corrected third data into a sixth physical program unit among the physical program units of the physical erase units and re-map a logical address mapped to the fifth physical program unit to the sixth physical program unit.

15. A memory controller, for controlling a memory storage apparatus having a flash memory module is provided, wherein the flash memory module has a plurality of physical erase unit and each of the physical erase unit has a plurality of physical program unit, the memory controller comprising:

a host interface, configured to couple to a host system;

a memory interface, configured to be coupled to the flash memory module;

an error checking and correcting circuit; and a memory management circuit, coupled to the host interface, the memory interface, and the error checking and correcting circuit, wherein the memory management circuit is configured to detect an operating temperature of the memory storage apparatus and determine whether the operating temperature of the memory storage apparatus is larger than a predetermined temperature, wherein the memory management circuit is further configured to use a first data storing mode to program the flash memory module if the operating temperature of the memory storage apparatus is not larger than the predetermined temperature; and wherein the memory management circuit is further configured to use a second data storing mode to program the flash memory module if the operating temperature of the memory storage apparatus is larger than the predetermined temperature, wherein the first data storing mode is different from the second data storing mode, wherein the physical program units of each of the physical erase units includes a plurality of lower physical program units and a plurality of upper physical program units and a speed of writing data into the lower physical program units is larger than a speed of writing data into the upper physical program units, wherein in the operation of using the first data storing mode to program the flash memory module, the memory management circuit is configured to receive second data from a host system and write the second data into a first physical erase unit among the physical erase units, wherein the lower physical program units and the upper physical program of the first physical erase unit are used to write data, wherein in the operation of using the second data storing mode to program the flash memory module, the memory management circuit is configured to receive the second data from the host system and write the second data into a second physical erase unit among the physical erase units, wherein the lower physical program units of the second physical erase unit are used to write data and the upper physical program units of the second physical erase unit are not used to write data.

16. A memory controller, for controlling a memory storage apparatus having a flash memory module is provided, wherein the flash memory module has a plurality of physical erase unit and each of the physical erase unit has a plurality of physical program unit, the memory controller comprising:

a host interface, configured to couple to a host system;
a memory interface, configured to be coupled to the flash memory module;
an error checking and correcting circuit; and
a memory management circuit, coupled to the host interface, the memory interface, and the error checking and correcting circuit, wherein the memory management circuit is configured to detect an operating temperature of the memory storage apparatus and determine whether the operating temperature of the memory storage apparatus is larger than a predetermined temperature, wherein the memory management circuit is further configured to use a first data storing mode to program the flash memory module if the operating temperature of the memory storage apparatus is not larger than the predetermined temperature; and wherein the memory management circuit is further configured to use a second data storing mode to program the flash memory module if the operating temperature of the memory storage apparatus is larger than the predetermined temperature, wherein the first data storing mode is different from the second data storing mode, wherein in the operation of using the first data storing mode to program the flash memory module, the memory management circuit performs a first read disturb preventing operation with a third frequency, wherein in the operation of using the second data storing mode to program the flash memory module, the memory management circuit performs a second read disturb preventing operation with a fourth frequency, wherein the fourth frequency is larger than the third frequency, wherein in the operation of performing the first read disturb preventing operation, the memory management circuit reads second data from a third physical program unit among the physical program units of the physical erase units, corrects the second data, and determines whether the amount of error bits occurring in the second data read from the third physical program unit is larger than a third number, wherein in the operation of performing the first read disturb preventing operation, if the amount of the error bits occurring in the second data read from the third physical program unit is larger than the third number, the memory management circuit writes the corrected second data into a fourth physical program unit among the physical program units of the physical erase units and re-maps a logical address mapped to the third physical program unit to the fourth physical program unit, wherein in the operation of performing the second read disturb preventing operation, the memory management circuit reads third data from a fifth physical program unit among the physical program units of the physical erase units, corrects the third data, and determines whether the amount of error bits occurring in the third data read from the fifth physical program unit is larger than a fourth number, wherein in the operation of performing the second read disturb preventing operation, if the amount of the error bits occurring in the third data read from the third physical program unit is larger than the fourth number, the memory management circuit writes the corrected third data into a sixth physical program unit among the physical program units of the physical erase units and re-maps a logical address mapped to the fifth physical program unit to the sixth physical program unit.

17. A memory storage apparatus, comprising:
a connector, configured to couple to a host system;
a flash memory module, having a plurality of physical erase unit, wherein each of the physical erase unit has a plurality of physical program unit;
a memory controller, coupled to the connector and the flash memory module; and
a thermal sensor, coupled to the memory controller and configured to detect an operating temperature, wherein the memory controller is configured to determine whether the operating temperature of the memory storage apparatus is larger than a predetermined temperature, wherein the memory controller uses a first data storing mode to program the flash memory module if the operating temperature of the memory storage apparatus is not larger than a predetermined temperature, wherein the memory controller is further configured to use a second data storing mode to program the flash memory module if the operating temperature of the memory storage apparatus is larger than the predetermined temperature, wherein the first data storing mode is different from the second data storing mode, wherein the physical program units of each of the physical erase units includes a plurality of lower physical program units and a plurality of upper physical program units and a speed of writing data into the lower physical program units is larger than a speed of writing data into the upper physical program units, wherein in the operation of using the first data storing mode to program the flash memory module, the memory controller is configured to receive second data from a host system and write the second data into a first physical erase unit among the physical erase units, wherein the lower physical program units and the upper physical program of the first physical erase unit are used to write data, wherein in the operation of using the second data storing mode to program the flash memory module, the memory controller is configured to receive the second data from the host system and write the second data into a second physical erase unit among the physical erase units, wherein the lower physical program units of the second physical erase unit are used to write data and the upper physical program units of the second physical erase unit are not used to write data.

18. A memory storage apparatus, comprising:
a connector, configured to couple to a host system;
a flash memory module, having a plurality of physical erase unit, wherein each of the physical erase unit has a plurality of physical program unit;
a memory controller, coupled to the connector and the flash memory module; and
a thermal sensor, coupled to the memory controller and configured to detect an operating temperature,
wherein the memory controller is configured to determine whether the operating temperature of the memory storage apparatus is larger than a predetermined temperature,
wherein the memory controller uses a first data storing mode to program the flash memory module if the operating temperature of the memory storage apparatus is not larger than a predetermined temperature,
wherein the memory controller is further configured to use a second data storing mode to program the flash memory module if the operating temperature of the memory storage apparatus is larger than the predetermined temperature, wherein the first data storing mode is different from the second data storing mode, wherein in the operation of using the first data storing mode to program the flash memory module, the memory management circuit performs a first read disturb preventing operation with a third frequency, wherein in the operation of using the second data storing mode to program the flash memory module, the memory management circuit performs a second read disturb preventing operation with a fourth frequency, wherein the fourth frequency is larger than the third frequency, wherein in the operation of performing the first read disturb preventing operation, the memory controller reads second data from a third physical program unit among the physical program units of the physical erase units, corrects the second data read from the third physical program unit and determines whether the amount of error bits occurring in the second data read from the third physical program unit is larger than a third number, wherein in the operation of performing the first read disturb preventing operation, if the amount of the error bits occurring in the second data read from the third physical program unit is larger than the third number, the memory controller writes the corrected second data into a fourth physical program unit among the physical program units of the physical erase units and re-maps a logical address mapped to the third physical program unit to the fourth physical program unit, wherein in the operation of performing the second read disturb preventing operation, the memory controller reads third data from a fifth physical program unit among the physical program units of the physical erase units, corrects the third data from the fifth physical program unit and determines whether the amount of error bits occurring in the third data read from the fifth physical program unit is larger than a fourth number, wherein in the operation of performing the second read disturb preventing operation, if the amount of the error bits occurring in the third data read from the third physical program unit is larger than the fourth number, the memory controller writes the corrected third data into a sixth physical program unit among the physical program units of the physical erase units and re-maps a logical address mapped to the fifth physical program unit to the sixth physical program unit.

\* \* \* \* \*